US011727803B2

(12) United States Patent
Madrigal et al.

(10) Patent No.: US 11,727,803 B2
(45) Date of Patent: Aug. 15, 2023

(54) NETWORK COMPUTER SYSTEM TO EVALUATE AN OPERATOR OF A FREIGHT VEHICLE

(71) Applicant: Uber Technologies, Inc., San Francisco, CA (US)

(72) Inventors: Luis Madrigal, San Francisco, CA (US); Eyal Lasker, San Francisco, CA (US); Xiao Guo, San Francisco, CA (US); Padmini Pyapali, San Francisco, CA (US); Tony Ran Zhang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/526,524

(22) Filed: Nov. 15, 2021

(65) Prior Publication Data
US 2022/0148425 A1 May 12, 2022

Related U.S. Application Data

(63) Continuation of application No. 16/849,504, filed on Apr. 15, 2020, now Pat. No. 11,176,822, which is a
(Continued)

(51) Int. Cl.
*G08G 1/123* (2006.01)
*G08G 1/127* (2006.01)
(Continued)

(52) U.S. Cl.
CPC ............. *G08G 1/127* (2013.01); *B60W 40/09* (2013.01); *G06Q 10/063* (2013.01);
(Continued)

(58) Field of Classification Search
CPC ............................ G01C 21/3438; G08G 1/127
(Continued)

(56) References Cited

U.S. PATENT DOCUMENTS

| 3,953,720 A | 4/1976 | Kelch |
| 5,880,958 A | 3/1999 | Helms et al. |

(Continued)

FOREIGN PATENT DOCUMENTS

| CN | 101951545 | 1/2011 |
| CN | 103692969 | 4/2014 |

(Continued)

OTHER PUBLICATIONS

Alfred Round et al. "Future Ride: Adopting New Technologies to Paratransit in the United States", Working Paper, UCTC No. 306, University of California Transportation Center, 51 pages.
(Continued)

*Primary Examiner* — Qutbuddin Ghulamali
(74) *Attorney, Agent, or Firm* — Dority & Manning, P.A.

(57) ABSTRACT

A computer system can determine historical interval data of a freight operator from completed freight service requests associated with the freight operator. Additionally, while the freight operator is fulfilling a current freight service request, the computer system can determine at least a first likely downtime interval for a non-operating activity of the freight operator prior to the freight operator arriving at a pickup location or a destination location of the current freight service request, based on the historical interval data. Also, the computer system can determine an estimated arrival time for the freight operator to arrive at the pickup location or the destination location of the current freight service request, based at least in part on the first likely down time interval.

(Continued)

Moreover, the computer system can update a record associated with the freight operator to reflect the estimated arrival time.

20 Claims, 4 Drawing Sheets

Related U.S. Application Data continuation of application No. 16/380,580, filed on Apr. 10, 2019, now Pat. No. 10,657,813, which is a continuation of application No. 15/804,829, filed on Nov. 6, 2017, now Pat. No. 10,293,832.

(60) Provisional application No. 62/576,859, filed on Oct. 25, 2017.

(51) Int. Cl.
| | |
|---|---|
| B60W 40/09 | (2012.01) |
| G08G 1/00 | (2006.01) |
| G07C 5/00 | (2006.01) |
| G07C 5/08 | (2006.01) |
| G06Q 10/063 | (2023.01) |
| G06Q 10/0639 | (2023.01) |
| G08G 1/14 | (2006.01) |
| H04W 4/40 | (2018.01) |
| H04W 4/46 | (2018.01) |
| B60W 40/08 | (2012.01) |

(52) U.S. Cl.
CPC ....... *G06Q 10/06398* (2013.01); *G07C 5/008* (2013.01); *G07C 5/08* (2013.01); *G07C 5/0841* (2013.01); *G08G 1/123* (2013.01); *G08G 1/148* (2013.01); *G08G 1/20* (2013.01); *H04W 4/40* (2018.02); *H04W 4/46* (2018.02); *B60W 2040/0818* (2013.01)

(58) Field of Classification Search
USPC ........................................................ 340/994
See application file for complete search history.

(56) References Cited

U.S. PATENT DOCUMENTS

| | | | |
|---|---|---|---|
| 6,411,897 B1* | 6/2002 | Gaspard, II | G06Q 10/047 |
| | | | 701/410 |
| 6,456,207 B1 | 9/2002 | Yen | |
| 6,516,056 B1 | 2/2003 | Justice et al. | |
| 6,591,253 B1 | 7/2003 | Dinkin et al. | |
| 6,879,962 B1 | 4/2005 | Smith et al. | |
| 7,315,780 B2 | 1/2008 | Sugahara et al. | |
| 7,353,181 B2 | 4/2008 | Nel | |
| 7,385,529 B2 | 6/2008 | Hersh et al. | |
| 7,552,063 B1 | 6/2009 | McEachern | |
| 7,561,069 B2 | 7/2009 | Horstmeyer | |
| 8,131,307 B2 | 3/2012 | Lubeck et al. | |
| 8,271,316 B2 | 9/2012 | Blackshaw et al. | |
| 9,135,803 B1 | 9/2015 | Fields et al. | |
| 9,256,852 B1 | 2/2016 | Myllymaki | |
| 9,478,150 B1* | 10/2016 | Fields | G01C 21/3676 |
| 9,552,564 B1 | 1/2017 | Martenis | |
| 9,908,530 B1 | 3/2018 | Fields et al. | |
| 9,921,070 B1* | 3/2018 | Nimchuk | G01C 21/3679 |
| 9,955,326 B2* | 4/2018 | Avrahami | G08B 21/24 |
| 2002/0034292 A1 | 3/2002 | Tuoriniemi et al. | |
| 2002/0065738 A1 | 5/2002 | Riggs et al. | |
| 2002/0095308 A1* | 7/2002 | Pragelas | G06Q 20/401 |
| | | | 705/75 |
| 2002/0138338 A1 | 9/2002 | Trauth et al. | |
| 2002/0188517 A1 | 12/2002 | Banerjee et al. | |
| 2002/0194129 A1 | 12/2002 | Furuya et al. | |
| 2003/0036935 A1 | 2/2003 | Nel | |
| 2003/0087648 A1 | 5/2003 | Mezhvinsky et al. | |
| 2003/0233190 A1 | 12/2003 | Jones | |
| 2004/0106399 A1 | 6/2004 | Ki | |
| 2004/0112959 A1 | 6/2004 | Jun | |
| 2004/0158483 A1 | 8/2004 | LeCouturier | |
| 2004/0219933 A1 | 11/2004 | Faith | |
| 2004/0249699 A1 | 12/2004 | Laurent et al. | |
| 2004/0249818 A1 | 12/2004 | Isaac | |
| 2004/0260470 A1 | 12/2004 | Rast | |
| 2005/0096837 A1 | 5/2005 | Yoshizumi | |
| 2005/0149382 A1 | 7/2005 | Fenner et al. | |
| 2005/0227704 A1 | 10/2005 | Ferra et al. | |
| 2005/0278063 A1 | 12/2005 | Hersh et al. | |
| 2006/0059023 A1 | 3/2006 | Mashinsky | |
| 2006/0136254 A1 | 6/2006 | Greenstein | |
| 2006/0155460 A1 | 7/2006 | Raney | |
| 2006/0195348 A1 | 8/2006 | Peterkofsky et al. | |
| 2006/0200306 A1 | 9/2006 | Adamcyzk | |
| 2006/0200396 A1 | 9/2006 | Satterfield et al. | |
| 2006/0206387 A1 | 9/2006 | Peterkofsky et al. | |
| 2006/0217885 A1 | 9/2006 | Crady et al. | |
| 2007/0103342 A1 | 5/2007 | Milleville | |
| 2007/0221791 A1 | 9/2007 | Voelk et al. | |
| 2008/0086322 A1 | 4/2008 | Wallace | |
| 2008/0114629 A1 | 5/2008 | Pavlov | |
| 2008/0125967 A1 | 5/2008 | Sprigg | |
| 2008/0140597 A1 | 6/2008 | Satir | |
| 2008/0158016 A1 | 7/2008 | Wang | |
| 2008/0189207 A1 | 8/2008 | Wurster | |
| 2008/0195428 A1 | 8/2008 | O'Sullivan | |
| 2008/0270019 A1 | 10/2008 | Anderson | |
| 2008/0270204 A1 | 10/2008 | Poykko | |
| 2008/0312991 A1 | 12/2008 | Bharadwaj | |
| 2009/0030770 A1 | 1/2009 | Hersh et al. | |
| 2009/0037095 A1 | 2/2009 | Jani et al. | |
| 2009/0049119 A1 | 2/2009 | Marcinkiewicz et al. | |
| 2009/0083111 A1 | 3/2009 | Carr | |
| 2009/0099971 A1 | 4/2009 | Salemme | |
| 2009/0125228 A1 | 5/2009 | Dicke | |
| 2009/0177502 A1 | 7/2009 | Doinoff et al. | |
| 2009/0216600 A1 | 8/2009 | Hill | |
| 2009/0222284 A1 | 9/2009 | McEachern | |
| 2009/0254270 A1 | 10/2009 | Yu | |
| 2009/0313077 A1 | 12/2009 | Wheeler | |
| 2010/0017275 A1 | 1/2010 | Carlson | |
| 2010/0076988 A1 | 3/2010 | Kenedy et al. | |
| 2010/0243724 A1 | 9/2010 | Golla | |
| 2011/0010300 A1 | 1/2011 | Audet | |
| 2011/0099040 A1 | 4/2011 | Felt et al. | |
| 2011/0060600 A1 | 5/2011 | Fox et al. | |
| 2011/0137696 A1 | 6/2011 | Meyer et al. | |
| 2011/0153495 A1 | 6/2011 | Dixon et al. | |
| 2012/0036082 A1 | 2/2012 | Cha et al. | |
| 2012/0130627 A1 | 5/2012 | Islam et al. | |
| 2012/0179764 A1 | 7/2012 | Erdal | |
| 2012/0253548 A1 | 10/2012 | Davidson | |
| 2013/0030873 A1 | 1/2013 | Davidson | |
| 2013/0041720 A1 | 2/2013 | Spires | |
| 2013/0245991 A1 | 9/2013 | Kriss | |
| 2013/0335193 A1 | 12/2013 | Hanson et al. | |
| 2014/0122147 A1 | 5/2014 | Christie et al. | |
| 2014/0200804 A1 | 7/2014 | Wippler | |
| 2014/0229399 A1 | 8/2014 | Ranganathan et al. | |
| 2014/0249742 A1* | 9/2014 | Krivacic | G08G 1/14 |
| | | | 340/932.2 |
| 2014/0324633 A1 | 10/2014 | Pollak et al. | |
| 2014/0330596 A1* | 11/2014 | Depura | B60W 40/09 |
| | | | 701/33.4 |
| 2015/0006428 A1 | 1/2015 | Miller et al. | |
| 2015/0081162 A1 | 3/2015 | Mitchell et al. | |
| 2015/0088581 A1* | 3/2015 | Ikawa | G06Q 10/08 |
| | | | 705/7.23 |
| 2015/0161696 A1 | 6/2015 | Jones et al. | |
| 2015/0379468 A1 | 12/2015 | Harvey | |
| 2016/0012391 A1 | 1/2016 | Burnett | |
| 2016/0042303 A1 | 2/2016 | Medina et al. | |
| 2016/0047646 A1 | 2/2016 | Ochsendorf et al. | |
| 2016/0071056 A1 | 3/2016 | Ellison et al. | |

(56) References Cited

U.S. PATENT DOCUMENTS

| | | | |
|---|---|---|---|
| 2016/0104111 A1 | 4/2016 | Jones et al. | |
| 2016/0202069 A1* | 7/2016 | Wippler, III | G01C 21/3461 701/400 |
| 2016/0273922 A1 | 9/2016 | Stefan | |
| 2016/0300186 A1 | 10/2016 | Scharaswak et al. | |
| 2016/0334236 A1* | 11/2016 | Mason | G01C 21/3461 |
| 2017/0046658 A1 | 2/2017 | Jones et al. | |
| 2017/0109696 A1 | 4/2017 | Serjeantson et al. | |
| 2017/0124506 A1 | 5/2017 | Khan | |
| 2017/0144671 A1* | 5/2017 | Memani | B60W 40/09 |
| 2017/0249847 A1 | 8/2017 | Marueli | |
| 2018/0025417 A1 | 1/2018 | Brathwaite et al. | |
| 2018/0068269 A1 | 3/2018 | Pillai et al. | |
| 2018/0096300 A1 | 4/2018 | Boye et al. | |
| 2018/0211217 A1 | 7/2018 | Berdinis et al. | |
| 2018/0211218 A1 | 7/2018 | Berdinis et al. | |
| 2018/0211541 A1 | 7/2018 | Rakah et al. | |
| 2019/0095859 A1 | 3/2019 | Pike et al. | |
| 2019/0118825 A1 | 4/2019 | Madrigal et al. | |
| 2019/0122551 A1 | 4/2019 | Madrigal et al. | |
| 2019/0130351 A1 | 5/2019 | Arena | |
| 2019/0213529 A1 | 7/2019 | Donnelly et al. | |
| 2019/0232967 A1 | 8/2019 | Madrigal et al. | |
| 2019/0318298 A1 | 10/2019 | Driegert | |
| 2019/0385119 A1 | 12/2019 | Chang et al. | |
| 2020/0027348 A1 | 1/2020 | Madrigal et al. | |
| 2020/0080853 A1 | 3/2020 | Tam | |
| 2020/0282988 A1 | 9/2020 | Madrigal et al. | |
| 2021/0042705 A1 | 2/2021 | Suen et al. | |

FOREIGN PATENT DOCUMENTS

| | | |
|---|---|---|
| CN | 103761635 | 4/2014 |
| CN | 103870893 | 6/2014 |
| CN | 105069594 | 11/2015 |
| EP | 2827289 | 1/2015 |
| JP | 2002123887 | 4/2002 |
| JP | 2006/323784 | 11/2006 |
| JP | 2017165509 | 9/2017 |
| KR | 1020170026805 | 3/2017 |
| NL | 2017377 | 3/2018 |
| WO | WO 1995/027964 | 10/1995 |
| WO | WO 2016/133594 | 8/2016 |
| WO | WO 2017/025955 | 2/2017 |
| WO | WO 2017/107854 | 6/2017 |
| WO | WO 2018/106730 | 6/2018 |
| WO | WO 2018/107046 | 6/2018 |
| WO | WO 2018/136179 | 7/2018 |

OTHER PUBLICATIONS

Examination Report for AU 2010325793, dated Jun. 21, 2013.
Examination Report No. 2 for AU 2015202596 dated May 22, 2017.
Extended European Search Report for EP 10835261.8, dated Oct. 10, 2016.
Hunt, J.B. Carrier 230 Tutorial: Load Board Features [Video], https://www.jbhunt.com/blog/2018/03/01/360-load-board-features Mar. 1, 2018.
Hunt, J.B. "Find a Load, Make an Offer with Carrier 360: Watch the Video, https://www.jbhunt.com/blog/2017/10/25/ carrier-360-video Oct. 25, 2017".
Hunt, J.B. "Get your Next Load Recommendations from JP Hunt 360 Account", http://jbhunt.com/blog/2017/09/28/find-loads-carrier-360/ Sep. 28, 2017.
Hunt, J.B., "Booking & Dispatching Loads https://www.jbhunt.com/blog/2018/05/22/carrier-360-dispatching-freight/ May 22, 2018".
Hunt, J.B., "Carrier 360 Introduces I'm Not Driving Mode, https://jbhunt.com/blog/2019/06/03/ carrier-360- introduces-im-not-driving-mde/ Jun. 3, 2019".
Hunt, J.B., "Carrier 360 Tutorial: Creating Favorite Lanes [Video] https://jbhunt.com/blog/2018/04/13/carrier-360-favorite-lanes/ Apr. 13, 2018".
Hunt, J.B., "Carrier 360 Tutorial: Load Board Features [Video], https://www.jbhunt.com/blog/2018/03/01/360-load-board-features" Mar. 1, 2018.
Hunt, J.B., "Eight Things you can do using your J.B. Hunt 360 account, https://www.jbhunt.com/blog/2017/06/13/jbhunt-360, Jun. 13, 2017".
Hunt, J.B., "Get your next load recommendation from J.B. Hunt 360, https://www.jbhunt.com/blog/2017/08/02/360-load-recs/ Aug. 2, 2017".
Hunt, J.B., "Loads Delivered to You: Three Ways to Find Loads Using Carrier 360 by J.B. Hunt, https:// www.jbhunt.com/blog/2017/09/28/find-loads- carrier-360/ Sep. 28, 2017".
Hunt, J.B., "Simpler is Better: Easy check calls and automated detention, https://www.jbhunt.com/blog/2018/11/19/ check-calls-detention-carrier-360 Nov. 19, 2018".
International Preliminary Report on Patentability for PCT/US2019/036622, dated Aug. 4, 2020.
International Search Report and Written Opinion for PCT/US2018/057538, dated Jan. 25, 2019.
International Search Report and Written Opinion for PCT/US2019/012516, dated Apr. 24, 2019.
International Search Report and Written Opinion for PCT/US2019/036622, dated Sep. 23, 2019.
International Search Report and Written Opinion issued for PCT/US2017/066765, dated Apr. 13, 2018.
Kuebix, "Effectively Managing Big Data in Your Supply Chain: How to take action now that will ensure success in the future.", Aug. 22, 2017.
Search Report dated Oct. 1, 2013, for EP 10835261.8.
Shigemitsu et al. "AVM System", Fujistu Ten Technicl Journl No. 33, 27:34, 2009.
Written Opinion for PCT/US2019/012516, dated Oct. 11, 2019.
U.S. Appl. No. 15/804,838, filed Nov. 6, 2017, 22 pages.
U.S. Appl. No. 16/529,489, filed Aug. 1, 2019, 22 pages.

* cited by examiner

NETWORK COMPUTER SYSTEM TO EVALUATE AN OPERATOR OF A FREIGHT VEHICLE

CROSS-REFERENCE TO RELATED APPLICATIONS

This application is a continuation of U.S. patent application Ser. No. 16/849,504, filed Apr. 15, 2020, which application is a continuation of U.S. patent application Ser. No. 16/380,580 (now U.S. Pat. No. 10,657,813), filed Apr. 10, 2019, which application is a continuation of U.S. patent application Ser. No. 15/804,829 (now U.S. Pat. No. 10,293,832), filed Nov. 6, 2017, which claims benefit of priority to U.S. Provisional Patent Application No. 62/576,859, filed Oct. 25, 2017; the aforementioned priority applications being hereby fully incorporated by reference in their entireties.

BACKGROUND

Generally, freight vehicles have a heightened standard or care with respect to their operation, as compared to other types of road vehicles. As such, a greater amount of skill and diligence may be required from freight operators as compared to other drivers. For example, freight operators may be required to have special class driving licenses. While requirements of freight operators and vehicles is heightened, there are generally few mechanisms in place to monitor freight operators, given the large distances freight operators travel.

Figure 1:
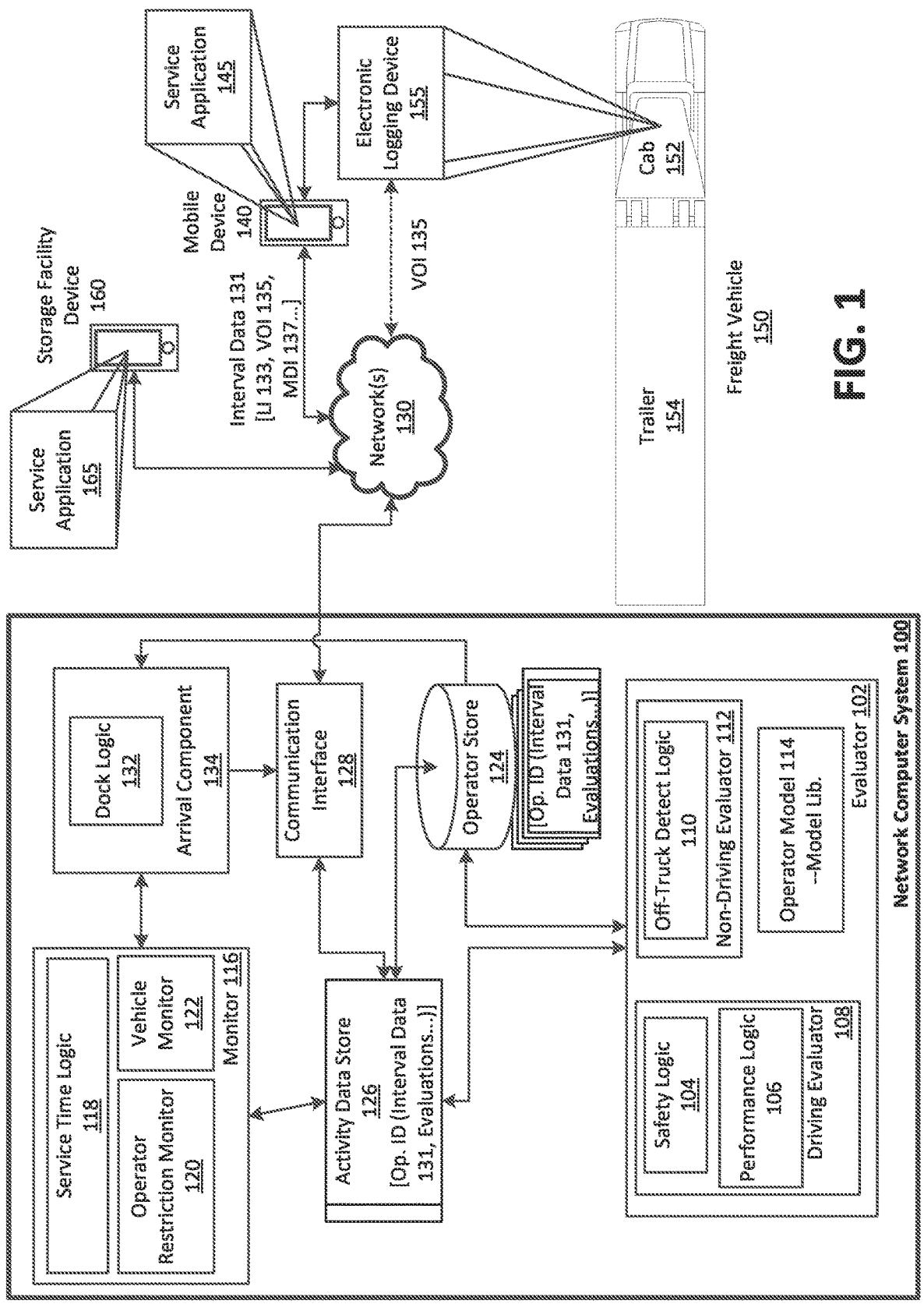
FIG. 1 illustrates an example network computer system to evaluate a freight operator.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a network computer system that can continuously or periodically monitor an operator (e.g., a freight vehicle operator) operating a freight vehicle (e.g., a freight truck) during a time interval. The network computer system can evaluate driving and/or non-driving related freight service performances of the operator while the operator is performing the freight service during a time interval. The network computer system can base the evaluations on interval data (e.g., location information of the freight vehicle, vehicle operation information of the freight vehicle, and mobile device information of a mobile device the operator is using during the time interval) provided by the mobile device the operator is using during that time interval. For example, the network computer system can evaluate performance metrics related to the operation of the freight vehicle the operator is operating based on the vehicle operation information of the interval data (e.g., fuel consumption, braking performance, acceleration, when the engine is applying power, when the engine is idle, when the engine is off, etc.). In some implementations, the network computer system can determine one or more sub-intervals that the freight vehicle is switched off or the operator has left the freight vehicle the operator was operating, when the freight vehicle is idle. Additionally, in other implementations, the network computer system can evaluate the operator during a time interval where the operator could be assigned multiple freight services and/or operate multiple freight vehicles to perform one or more assigned freight services. In some implementations, the network computer system can assign a freight service request from a requester to an available operator.

In some examples, a network computer system is configured to remotely evaluate freight operators in a manner that is objective and specific to the freight services industry. For example, as described herein, a network computer system can base its evaluations on data (e.g., interval data) generated and/or collected from a mobile device associated with the freight operator and/or an electronic logging device of the freight service vehicle. Additionally, such evaluations may be made specific to the freight services industry (e.g., how safe a freight operator operates the freight vehicle based on the number of left turns the freight vehicle takes).

In other examples, the network computer system can determine a time of arrival for the freight vehicle that the operator is operating, based on the interval data (e.g., location information of the freight vehicle, vehicle operation information of the freight vehicle, and mobile device information of a mobile device the operator is using during the time interval). For example, at a given instance, the network computer system can determine a time of arrival based at least in part on (i) a distance between the current location of the freight vehicle to the given destination location, (ii) a time for the freight vehicle to travel the distance, and (iii) a duration of one or more required downtime intervals during which a restriction exists against the operator operating the freight vehicle.

According to some examples, a network computer system may remotely monitor a freight vehicle based on data (e.g., interval data) generated and/or collected from a mobile device and/or an electronic logging device of the freight service vehicle. Additionally, the time of arrival can be continuously or periodically updated, as to enable entities operating storage facilities that are to receive loads or have loads picked up (e.g., warehouse at the pick-up location and the warehouse at the destination location) to appropriately allocate the correct amount of resources to accommodate an incoming freight vehicle.

As provided herein, the terms "user," "operator" and "service provider" are used throughout this application interchangeably to describe person utilizing a provider application on a computing device to provide on-demand freight services to a freight service requester. A freight service requester can be a person or group of people who utilize a requester application on a computing device to request, over one or more networks, on-demand freight services from a network computing system.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1 illustrates an example network computer system to evaluate a freight operator. In particular, network computer system 100 uses data obtained over a given time interval ("interval data 131") to evaluate various facets of a freight operator's performance. According to some examples, the network computer system 100 can evaluate and/or monitor an operator based on interval data 131 that is periodically or continuously obtained from mobile device 140 (e.g., smartphones, tablet computers, virtual reality or augmented reality handsets, on-board computing systems of vehicles, etc.). Interval data 131 is data generated from mobile device 140 and/or electronic logging device (ELD) 155 that is related to an operator operating freight vehicle 150 during a time interval or a duration of time that the operator is being monitored.

In some implementations, network computer system 100 can evaluate and/or monitor the operator in the context of an on-demand freight service. In such implementations, network computer system 100 can manage the on-demand freight service by assigning a freight service request from a requester to an available operator. Additionally, network computer system 100 can evaluate and/or monitor the operator while the operator is fulfilling the freight service request. The freight service request can include one or more load identifiers for one or more loads to be transported and routing information. The routing information can include the pick-up location (e.g., a warehouse where the load is being housed), the destination location (e.g., the location where the load is to be dropped off), the preferred time or window of time to pick up the load at the pick-up location, and/or the preferred time or window of time of freight service completion (e.g., the preferred time to drop-off the load at the destination location). Additionally, network computer system 100 can determine a hauling route for operator to take based on the routing information. In some implementations, network computer system 100 can take into account toll locations, traffic data and/or traffic data when determining a hauling route. In such implementations, location information for one or more tolls in one or more geographic regions, weather data and/or traffic data can be obtained from a third-party provider. In other implementations, weather data and/or traffic data can be obtained from one or more sensors of freight vehicle 150 and other freight vehicles traveling in and around the same region or hauling route as freight vehicle 150.

As illustrated in FIG. 1, network computer system 100 can include evaluator 108, monitor 116, operator store 124, real-time data-base 126, and communication interface 128. During a time interval that the operator is operating freight vehicle 150 (e.g., between a pick-up/start location and a destination location specified in an assigned freight service request), network computer system 100 can control or cause mobile device 140 to provide or transmit interval data 131 to network computer system 100. In such examples, network computer system 100 can obtain interval data 131 from mobile device 140, over network 130 and through communication interface 128. Additionally, interval data 131 can include, for a given time interval, location information 133 of freight vehicle 150 (e.g., based on the location information provided by a location based resource of mobile device 140), vehicle operation information 135 of freight vehicle 150 (e.g., acceleration, braking, when the engine is idle, mileage, fuel consumption, an identifier of freight vehicle 150, etc.), and mobile device information 137 of mobile device 140 (e.g., sensor data).

Network computer system 100 can directly and wirelessly (e.g., WIFI, Bluetooth, BLE (Bluetooth low energy), NFC, or other appropriate short-range communication) obtain some of vehicle operation information 135 from ELD 155. In such examples, ELD 155 can obtain vehicle operation information 135 directly from the electronic computing unit (ECU) of freight vehicle 150. Examples of vehicle operation information 135 include acceleration, braking, when the engine is idle, mileage, fuel consumption, freight vehicle 150 error codes, and an identifier of freight vehicle 150. In some implementations, network computer system 100 can wirelessly obtain vehicle operation information 135 obtained from ELD 155 through mobile device 140. In such implementations, mobile device 140 can include in interval data 131 being provided to network computer system 100 vehicle operation information 135 obtained from ELD 155. In other implementations, network computer system 100 can control or cause mobile device 140 to connect with ELD 155. In such implementations, network computer system 100 can provide an instruction to mobile device 140 to connect to ELD 155.

Network computer system 100 can continuously or periodically update interval data 131 received from mobile device 140 and/or ELD 155. As illustrated in FIG. 1, network computer system 100 can include activity data store 126 that maintains a record (or set of records) for individual operators or freight operators who are providing freight services. For example, activity data store 126 can maintain separate records for individual operators. Network computer system 100 can associate each record for each operator with an operator identifier and a recent set of interval data 131 obtained from mobile device 140 of each operator.

Mobile device 140 can communicate an operator identifier to network computer system 100 using service application 145. Since mobile device 140 is the source of interval data 131, an operator can be evaluated over a duration in which the operator is operating multiple freight vehicles. Thus, network computer system 100 can evaluate the performance of the operator regardless of which freight vehicle the operator is operating.

According to some examples, the network computer system 100 can evaluate the driving and/or non-driving related freight service performances of an operator operating freight vehicle 150 during that time interval, based on the obtained interval data 131. For example, evaluator 102 can obtain interval data 131 (e.g., location information 133, vehicle operation, and mobile device 140 information) of an operator from activity data store 126 to evaluate a driving and/or non-driving related freight service performance of the operator during a time interval. Additionally, evaluator 102 can evaluate the operator by comparing interval data 131 of the operator to an operator model stored in operator model database 114. In some implementations, evaluator 102 can quantify (e.g., score) the driving and non-driving related performance of the operator during a time interval that operator is operating freight vehicle 150.

Evaluator 102 can include driving evaluator 108 to evaluate a driving related freight service performance of the operator during a time interval when the operator is operating freight vehicle 150. Driving evaluator 108 can include safety logic 104 to determine a manner that operator is operating freight vehicle 150 that is deemed safe, based on, for example models, rules, regulations etc. Additionally, driving evaluator 108 can include performance logic 106 to determine performance metrics of the operator operating freight vehicle 150. The performance metrics can include wear and tear to freight vehicle 150 (e.g., the operator's performance in shifting gears and the effect it has on the transmission of freight vehicle 150) and/or depletable vehicle resources efficiency (e.g., fuel efficiency) as the operator operates freight vehicle 150, based on, for example, models.

Safety logic 104 can utilize interval data 131 of an operator to determine whether the operator is operating freight vehicle 150 in a way that is deemed safe. Additionally, the determination can be based on a comparison between interval data 131 of the operator to an operator model. For example, safety logic 104 can determine a driving pattern or tendency, based on detected characteristics of a type of action that the driver performed (e.g., operator repeatedly braked very hard and/or accelerated sharply). Additionally, the determination can be based on a comparison between vehicle operation information 135, included in interval data 131 of the operator during a time interval when the operator was operating freight vehicle 150, and the operator model. In other examples, safety logic 104 can determine that during that same time interval, freight vehicle 150 took a high number of left turns in comparison to the operator model. The determination can be based on the comparison between mobile device information 137 of mobile device 140 (e.g., sensor information, for example, accelerometer information and/or gyroscope information of one or more sensors of mobile device 140) included in interval data 131 and the operator model. Taken together, safety logic 104 can further determine that the operator operated freight vehicle 150 not as safely as the operator model. Additionally, safety logic 104 can quantify such a determination by determining a safety score for the operator based on the comparison between interval data 131 of the operator and the operator model.

Performance logic 106 can utilize interval data 131 of an operator to determine performance metrics of the operator operating freight vehicle 150. The determination can be based on a comparison between interval data 131 of the operator during a time interval that the operator operated freight vehicle and an operator model. For example, performance logic 106 can determine the operator braked hard, accelerated aggressively, and freight vehicle 150 had a low fuel efficiency (based on miles traveled versus the amount of fuel consumed). The determination can be based on the comparison between vehicle operation information 135 included in interval data 131 and an operator model. Taken together, performance logic 106 can determine that the operator operated freight vehicle 150 not as well as the operator model. Additionally, performance logic 106 can quantify such a determination by determining a performance score for the operator.

Evaluator 102 can include non-driving evaluator 112 to evaluate a non-driving related performance of an operator during a time interval when the operator is operating freight vehicle 150. For example, evaluator 102 can evaluate an operator on the trustworthiness or reputation of the operator. In some implementations, non-driving evaluator 112 can determine a reputation or trustworthiness of the operator by evaluating how reliable, professional, and/or timely the operator is when performing their assigned freight service. Additionally, the reputation of the operator can be based on the comparison between interval data 131 of the operator to an operator model.

In some implementations, non-driving evaluator 112 can determine a timeliness of an operator based on interval data 131 (e.g., location information 133 of freight vehicle 150, vehicle operation information 135 of freight vehicle 150 and/or mobile device information 137 of mobile device 140)

of the operator, a hauling route of the freight service and preferred times of arrival to a pick-up location and/or a destination location that is specified in a freight service request. The hauling route can include a pick-up location and/or a destination location that is specified in the freight service request. In some examples, non-driving evaluator 112 can determine when freight vehicle 150 arrives at the pick-up location and/or the destination location, based on the location information provided by mobile device 140. Additionally, non-driving evaluator 112 can determine the timeliness of the operator by comparing the arrival times to the pick-up location and/or the destination location to the preferred times to pick up the load at the pick-up location and/or to drop off the load at the destination location.

Additionally, non-driving evaluator 112 can quantify the determination of timeliness by comparing the how close the arrival times were to the preferred times to an operator model. In some examples, non-driving evaluator 112 can quantify the timeliness of the operator (e.g. a timeliness score) to the pick-up location. In other examples, non-driving evaluator 112 can quantify the timeliness of the operator to the destination location. In yet other examples, non-driving evaluator 112 can quantify the overall freight service completion time (from the pick-up location to the destination location).

In some implementations, an individual at the pick-up location and/or destination location (e.g., the operator and/or requester) can confirm whether the operator picked up the load at the pick-up location and/or dropped off the load at the destination location. In such implementations, the individual can transmit a confirmation message from a mobile device (e.g., mobile device 140) to network computer system 100. For example, the individual can transmit the confirmation message from service application 145, through network(s) 130 and to network computer system 100. The confirmation message can include whether the load was picked up at the pick-up location or dropped-off/received at the destination location. In some examples, non-driving evaluator 112 can determine the time when the confirmation message was sent by the individual or received by network computer system 100. Additionally, non-driving evaluator 112 can take into account such times when determining the timeliness of the operator or confirming the pickup/drop-off times.

In other implementations, non-driving evaluator 112 can determine whether the operator is picking up a load or dropping off a load based on sensor information generated by mobile device 140. In such implementations, mobile device 140 can include one or more sensors (e.g., accelerometer and/or gyroscope) and the data generated from the one or more sensors can be included in interval data 131 (e.g., mobile device information 137 of mobile device 140) to be utilized by non-driving evaluator 112. In some examples, non-driving evaluator 112 can determine that the sensor information correlates to the operator picking-up the load. In other examples, non-driving evaluator 112 can determine that the sensor information correlates to the operator dropping off the load. In conjunction with location information of mobile device 140, non-driving evaluator 112 can confirm that the load was picked up at the pick-up location and/or dropped off at the destination location. Additionally, non-driving evaluator 112 can determine when the load was picked up and/or dropped off and take into account when the load was picked up and/or dropped off when determining the timeliness of the operator.

Non-driving evaluator 112 can also utilize feedback provided by a requester to evaluate the non-driving aspects of the operator's performance. In some implementations, the requester can provide feedback by providing a rating or other quantitative metric related to one or more parameters of the operator's freight service performance. For example, network computer system 100 can provide an instruction to a service application running on a mobile device of a requester of a freight service request to generate a feedback user interface. The feedback user interface can enable the requester to provide a rating or other quantitative metric for one or more parameters of the operator's freight service performance. Examples of parameters of the operator's freight service performance that the requester can provide a rating or other quantitative metric for include, timeliness of operator to pick-up location, timeliness of operator to destination location, speed of loading the load, professionalism, courteousness, the overall delivery service of the requester and state of load at drop off. Additionally, non-driving evaluator 112 can utilize the provided ratings and quantitative metrics to determine an overall reputation score for the operator. In some implementations, non-driving evaluator 112 can compare the ratings and quantitative metrics provided by the mobile device of the requester to an operator model when determining a reputation score for the operator.

In some implementations, the requester can also provide qualitative comments in conjunction with their quantitative assessment of the operator's freight service performance. For example, the instruction to generate the feedback user interface can also include an instruction to enable the requester to input qualitative comments. In some instances, the instruction can cause the feedback user interface to generate a text box for the requester to manually input their comments. In other instances, the instruction can cause the feedback user interface to generate a dropdown menu of pre-generated comments for the requester to select.

Other non-driving related freight service performance examples that evaluator 102 can evaluate operator on include whether the operator has left freight vehicle 150 (e.g., cab 152). In some implementations, non-driving evaluator 112 can utilize off-truck detect logic 110 to determine whether the operator has left freight vehicle 150, based on the sensor information (e.g., accelerometer information and/or gyroscope information) of mobile device 140 (e.g., mobile device information 137 of mobile device 140). In some examples, off-truck detect logic 110 can determine that the sensor information correlates to the operator stepping out of cab 152 of freight vehicle 150 (e.g., an acceleration in a negative direction). Additionally, mobile device 140 can time stamp the sensor information as to when such information was detected. As such, off-truck detect logic 110 can determine when the operator left cab 152. In other implementations, off-truck detect logic 110 can determine whether the operator has left freight vehicle 150 based on whether mobile device 140 is wirelessly or directly connected to ELD 155. For example, off-truck detect logic 110 can determine ELD 155 has been disconnected from mobile device 140. In such an example, off-truck detect logic 110 can determine that the operator may have left cab 152 based in part on determining mobile device 140 and ELD 155 are no longer connected. Additionally, off-truck detect logic 110 can determine and utilize the times of when mobile device 140 and ELD 155 were disconnected when evaluating the operator.

Activity data store 126 can update an operator account with corresponding operator evaluations (driving and non-driving related) of one or more operators provided by evaluator 102. In some implementations, evaluator 102 can identify an operator identifier associated with interval data 131 and/or rating/quantitative metric that each operator evaluation is based on. Additionally, evaluator 102 can associate each operator evaluation with the identified operator identifier associated with interval data 131 and/or rating/quantitative metric that each operator evaluation is based on. In such implementations, activity data store 126 can update each operator account based on the operator identifier associated with each operator evaluation and the operator identifier associated with each operator account. Additionally, activity data store 126 can provide to operator store 124 each operator evaluation and the associated operator identifier obtained from evaluator 102. Operator store 124 can store each operator evaluation of each operator that evaluator 102 provided.

Additionally, network computer system 100 can store historical interval data 131 of each operator in an operator store 124. For example, as illustrated in FIG. 1, network computer system 100 can include operator store 124 that can store interval data 131 (e.g., location information 133, vehicle operation information 135, and mobile device 140 information) and corresponding operator identifier provided by mobile device 140. In some implementations, operator store 124 and activity data store 126 can be separate databases. In other implementations, operator store 125 and activity data store 126 can be included in the same database.

Evaluator 102 can select an operator model to compare interval data 131 of an operator to, based on freight service parameters associated with each operator model that most resembles the parameters of the freight service the operator performed. In such implementations, evaluator 102 can include an operator model database 114. Operator model database 114 can store multiple operator models or just one generic operator model. In examples where operator model database 114 stores multiple operator models, each operator model can be associated with one or more freight service parameters. Examples of freight service parameters include a specific load weight, a range of load weight, a specific freight vehicle size, a range of freight vehicle sizes, a type of freight vehicle (e.g., a freight vehicle with refrigeration capabilities versus a freight vehicle without refrigeration capabilities), a type of load (e.g., perishable versus non-perishable loads, fragile versus non-fragile loads, etc.), weather conditions encountered and/or traffic conditions encountered.

Evaluator 102 can further analyze interval data 131 of the operator in light of weather data and/or traffic data when determining the driving and non-driving performance of the operator while operating freight vehicle 150. In some implementations, evaluator 102 can obtain sensor information that includes the weather information and/or traffic information from a third-party provider. Alternatively, the weather information and/or traffic information can be obtained from one or more sensors from freight vehicle 150 and other freight vehicles traveling in and around the same region as freight vehicle 150. In either implementation, evaluator 102 (e.g., safety logic 104, performance logic 106 and/or non-driving evaluator 112) can obtain the weather information and/or traffic information of the same region where the operator was operating freight vehicle 150 and during the same time interval as when interval data 131 was taken.

In some examples, safety logic 104 can determine a high safety score for the operator if compared to the operator model, safety logic 104 determines there was a higher rate of soft braking, a higher number of times freight vehicle 150 is accelerating, and that there were heavy rains and heavy traffic conditions at the time interval data 131 was taken and at the at the locations freight vehicle 150 was traveling in. In another example, performance logic can determine a low performance score for the operator if compared to the operator model, performance logic 106 determines a higher rate of hard braking, higher number of times freight vehicle 150 accelerated aggressively, fuel consumption was higher, and that it was sunny and traffic conditions were light at the time interval data 131 was taken and at the locations freight vehicle 150 was traveling in. In yet another example, non-driving evaluator 112 can determine a high timeliness score for the operator if compared to the operator model, non-driving evaluator 112 determines there was a delay to the pick-up location, a delay to the destination location, and there were heavy traffic conditions at the time interval data 131 was taken and at the locations freight vehicle 150 was traveling in.

Network computer system 100 can include monitor 116 to monitor an operator while an operator operates freight vehicle 150 during a time interval. As illustrated in FIG. 1, monitor 116 can include service time logic 118, vehicle monitor 122 and operator restriction monitor 120. In some implementations, monitor 116 can determine whether the operator has exceeded a freight service time restriction (e.g., the maximum amount of time an operator is legally allowed to operate freight vehicle 150 or a predetermined time an operator can operate freight vehicle 150). For example, vehicle monitor 122 can periodically or continuously obtain interval data 131 of an operator for monitor 116 to determine whether an amount of time the operator has operated freight vehicle 150 is equal to or exceeded a freight service time restriction. In some implementations, vehicle monitor 122 can periodically or continuously obtain, from activity data store 126 and/or operator store 124, interval data 131 (e.g., location information 133, vehicle operation, and mobile device 140 information) of an operator operating freight vehicle 150.

In some implementations, service time logic 118 can determine the amount of time an operator has operated freight vehicle 150 during a time interval (e.g., a hauling event, a day, a week, a month, etc.) based on interval data 131 obtained from activity data store 126 and/or operator store 124. For example, service time logic 118 can determine how long an operator has operated freight vehicle 150 by determining (i) when mobile device 140 was connected to ELD 155, (ii) when mobile device 140 was disconnected from ELD 155, (iii) when the engine was turned on and/or (iv) when the engine was turned off. Additionally, in some implementations, service time logic 118 can determine the amount of time the operator has operated freight vehicle 150 by taking into account (i) instances or sub-intervals of when the operator stops operating freight vehicle 150 (e.g., by determining, from vehicle operation information 135, when the engine of freight vehicle 150 is off), (ii) instances or sub-intervals of when freight vehicle 150 is idle (e.g., by determining, from vehicle operation information 135 and location information of mobile device 140, when the engine is on but freight vehicle 150 is not moving), and (iii) instances or sub-intervals of when operator has left freight vehicle 150 (e.g., from location information of mobile device 140 and/or whether mobile device 140 has disconnected from electronic logging device 155).

Additionally, in such implementations, monitor 116 can include operator restriction monitor 120 to determine whether the operator has exceeded a freight service time restriction, by determining whether the amount of time the operator has operated freight vehicle 150 is equal to or greater than the freight service time restriction. In some implementations, operator restriction monitor 120 can obtain data indicating the amount of time the operator has operated freight vehicle 150 in a time interval from service time logic 118. Additionally, operator restriction monitor 120 can compare the amount of time the operator has operated freight vehicle 150 to the freight service time restriction. In some examples, operator restriction monitor 120 can determine that the amount of time the operator has operated freight vehicle 150 is equal to or exceeds the freight service time restriction. Additionally, operator restriction monitor 120 can restrict the operator from accepting or selecting a freight service request presented on service application 145. For instance, operator restriction monitor 120 can provide an instruction to service application 145 to restrict the operator from selecting or accepting any freight service request presented by service application 145.

In other examples, operator restriction monitor 120 can determine that the amount of time the operator has operated freight vehicle 150 is less than the freight service time restriction. In such examples, operator restriction monitor 120 can limit which freight service request the operator can select or accept that is presented on service application 145. For instance, operator restriction monitor 120 can determine the amount of time remaining before the operator will exceed the freight service time restriction (e.g., based on interval data 131 of the operator, operator restriction monitor 120 can determine the amount of time remaining between the amount of time the operator has already operated freight vehicle 150 and the freight service time restriction). Additionally, operator restriction monitor 120 can determine an estimated service completion time for each freight service request obtained by network computer system 100. For instance, operator restriction monitor 120 can take into account the pick-up location, destination location, any indicated preferred time of freight service completion included in the freight service request. Taken together, operator restriction monitor 120 can identify one or more freight service requests obtained by network computer system 100 that have an estimated service completion time that is less than or equal to the amount of time remaining before the operator will exceed the freight service time restriction. In some implementations, operator restriction monitor 120 can provide an instruction to service application 145 to present only the identified one or more freight service requests. In other implementations, operator restriction monitor 120 can provide an instruction to service application 145 to limit the operator ton only be able to select a freight service request that is one of the identified one or more freight service requests.

Other parameters, operator restriction monitor 120 can take into account when determining the estimated service completion time for each freight service request obtained by network computer system 100, include (i) traffic data, (ii) weather data, and (iii) interval data 131 of the operator (e.g., current location of freight vehicle 150, vehicle operation information 135 of freight vehicle 150, and information of mobile device 140) operating freight vehicle 150, when determining the estimated service completion time for each freight service request obtained by network computer system 100.

In some implementations, monitor 116 can monitor the progress of an operator fulfilling an assigned freight service request and provide data to arrival component 134 to determine, at any given instance, a time of arrival that freight vehicle 150 is to arrive at a pick-up location and/or a destination location (e.g., a warehouse). Additionally, arrival component 134 can provide the time of arrival to storage facility device 160 of entities operating the storage facilities that are to receive loads or have loads picked up (e.g., warehouse at the pick-up location and the warehouse at the destination location). That way, entities operating storage facilities that are to receive loads or have loads picked up can appropriately allocate the correct amount of resources to accommodate an incoming freight vehicle 150. For example, in circumstances where freight vehicle 150 is delayed, network computer system 100, via arrival component 134, can notify the entities of the delay by transmitting a new time of arrival to storage facility device 160. As such, instead of the entities having their resources waiting idly by until freight vehicle 150 arrives, the entities can properly allocate resources for receiving the load from freight vehicle 150 or for the load to be picked up by an operator assigned to the freight service request, based on the new time of arrival. In some implementations, service application 165 can present the time of arrival and any update to the time of arrival (e.g., the transmitted new time of arrival) to the entities.

Arrival component 134 can determine, at any given instance a time of arrival that freight vehicle 150 is to arrive at the destination location or the pick-up location based on interval data 131 (e.g., location information 133 of freight vehicle 150, vehicle operation information 135 of freight vehicle 150, and information of mobile device 140) of an operator operating freight vehicle 150. For example, at any given instance when the operator is operating freight vehicle 150, arrival component 134 receive from vehicle monitor 122 interval data (e.g., location information 133 of freight vehicle 150, vehicle operation information 135 of freight vehicle 150, and information of mobile device 140) associated with the operator operating freight vehicle 150. Additionally, based on interval data 131, arrival component 134 can determine (i) a current location of freight vehicle 150 based on the location information provided by a location based resource of mobile device 140, (ii) a distance between the current location of the freight vehicle to the destination or pick-up location specified in the freight service request, and (iii) a time for the freight vehicle to travel the determined distance.

Arrival component 134 can take into account environmental information when determining an estimated time of arrival, weather and/or traffic conditions the operator may be currently in while performing their assigned freight service. For example, a third-party provider can provide environmental information that includes weather information and/or real-time traffic information to arrival component 134. Arrival component 134 can determine the current weather and/or current traffic conditions at the current location of the operator and freight vehicle 150 based on the environmental information and the location information of mobile device 140. Additionally, arrival component 134 can determine any delays the operator is encountering and determine and/or adjust the estimated time of arrival based on the delays that the operator is encountering.

In some implementations, arrival component 134 can determine traffic conditions and/or weather conditions the operator may encounter while performing their assigned freight service based on the sensor data and the hauling route the operator is taking. For example, arrival component 134 can determine that an accident occurred on the hauling route the operator is currently taking. In such an example, arrival component 134 can determine an estimated delay the operator may encounter and determine and/or adjust the estimate time of arrival based on the potential delay. In other examples, arrival component 134 can determine that weather conditions on the hauling route the operator is currently taking will likely get worse and cause a delay. In such examples, arrival component 134 can determine and/or adjust the estimated time of arrival based on the potential delay.

In various implementations, arrival component 134 can take into account the minimum number of downtime intervals (e.g., rest periods or periods of time an operator is not operating freight vehicle 150 so as to not exceed a freight service time restriction) and the duration of each downtime intervals an operator should take, when determining the estimated time of arrival that freight vehicle 150 is to arrive at the pick-up location and/or destination location. In such implementations, the number of downtime intervals and the duration of each downtime interval can be based on (i) an estimated time for freight vehicle 150 to arrive at the destination location (e.g., based on the current location of freight vehicle 150), (ii) a distance between the current location of freight vehicle 150, (iii) the amount of time the operator has operated freight vehicle 150 (as determined from data generated by service time logic 118), and (iv) the service time restriction (as provided by operator restriction monitor 120).

In some implementations, arrival component 134 can take into account environmental information (e.g., traffic and/or weather information) when determining the minimal amount of time or downtime intervals that an operator should take as to not exceed a freight service time restriction. For example, the traffic conditions and weather conditions an operator may encounter or is currently encountering may cause freight vehicle 150 to slow down and cause delays. As such, arrival component 134 may determine that the operator should take more downtime intervals due to the traffic and weather conditions the operator is encountering or may encounter. Meaning the minimum number of downtime intervals may increase. In other examples, arrival component 134 may determine that the traffic conditions and/or the weather conditions the operator may encounter or is encountering may not inhibit the speed of freight vehicle 150. As such, arrival component 134 may determine the operator could take less downtime intervals. Meaning the minimum number of downtime intervals may decrease.

In some implementations, service time logic 118 can determine that an operator is currently in a downtime interval and arrival component 134 can utilize such data to determine a remaining amount of downtime the operator should be in before being able to resume operating freight vehicle 150. In such implementations, service time logic 118 can make such determinations based on interval data 131 of the operator provided by vehicle monitor 122. For example, service time logic 118 can determine that an operator is currently in a downtime interval and the amount of downtime the operator has left, based on vehicle operation information 135 of freight vehicle 150 (e.g., instances of when the engine was turned off) and/or mobile device information 137 of mobile device 140 (e.g., instances of when mobile device 140 was disconnected from electronic logging device 155 and/or instances of when the operator is not at the same location as freight vehicle 150) included in interval data 131. Additionally, based on the determined minimum duration of each downtime interval an operator should take, arrival component 134 can determine the amount of downtime remaining before the operator can resume operating freight vehicle 150.

In some examples, a downtime interval can include the estimated amount of time an operator is to pick up a load at the pick-up location. Arrival component 134 can determine the estimated amount of time an operator picks up a load at a pick-up location, based on historical interval data 131 (e.g., location information 133 of freight vehicle 150, vehicle operation information 135 of freight vehicle 150 and mobile device information 137 of mobile device 140) stored in operator store 124. In other examples, a downtime interval can include the estimated amount of time an operator is to change out a load that is already in trailer 154. In such examples, an operator could be assigned to multiple freight service requests, and upon arriving at one destination location, the operator is to drop off one load, but pick up another load, before proceeding to the next destination location. Arrival component 134 can determine the estimated amount of time an operator changes out a load, based on historical interval data 131 (e.g., location information 133 of freight vehicle 150, vehicle operation information 135 of freight vehicle 150 and mobile device information 137 of mobile device 140) stored in operator store 124.

In yet other examples, a downtime interval can include one or more instances or sub-intervals that an operator may have to go to a weigh station. In such examples, arrival component 134 can determine the number of weight stations an operator may have to stop at, based on at least on the weight of the load being transported by freight vehicle 150, the hauling route the operator is currently taking, and whether a weigh station bypass is associated with freight vehicle 150. Additionally, a downtime interval can include the average amount of time an operator may spend at a weigh station. For example, arrival component 134 can determine the average amount of time an operator may spend at a particular weigh station, based on the time stamps and the location information of mobile device 140 arriving and departing a known weigh station. In some implementations, arrival component 134 can obtain location information of weigh stations from a third-party provider. In other implementations, operator store 124 can store the location information of weigh stations in one or more geographic regions.

Arrival component 134 can take into account the number of fuel stops freight vehicle 150 will likely have to take when determining the time of arrival freight vehicle is estimated to arrive at the pick-up location and/or destination location. Additionally, arrival component 134 can take into account the distance between the current location of freight vehicle 150 (e.g., location information 133) to the pick-up and/or destination location specified in the freight service request, when determining the number of fuel stops freight vehicle 150 will likely have to take. Additionally, arrival component 134 can determine from vehicle operation information 135 (e.g., the amount of fuel used as compared to the average distance traveled) of interval data 131, provided by vehicle monitor 122, the fuel efficiency of freight vehicle 150. Taken together, arrival component 134 can determine the number of fuel stops the operator may need to take to travel to the destination location.

Arrival component 134 can take into account size of a load a weight of the load and/or a type of the load to be transported by freight vehicle 150 when determining the estimated time of arrival. For example, the heavier the load, the slower freight vehicle 150 can travel. Additionally, the heavier the load, the worse the fuel efficiency of freight vehicle 150. Meaning freight vehicle 150 may need more fuel to travel to ta destination location specified in a freight service request. In some examples, arrival component 134 can take into account, the type of load, for example, whether the load is fragile or not, when determining the estimated time of arrival. For instance, a fragile load could cause the operator to operate freight vehicle 150 more carefully and/or more slowly. In some implementations, the load size and/or weight can be included in the freight service request. In other implementations, the size and/or weight of the load may be detected by one or more sensors (e.g., optical and weight bearing sensors) included in trailer 154. In such examples, the sensor data including the size and/or weight of the load can be included in interval data 131 provided by mobile device 140 and/or electronic logging device 155.

In some implementations, arrival component 134 can take into account the size, weight and/or type of the load when determining the minimum number of downtime intervals the operator should take. For example, arrival component 134 may determine that the weight, size and/or type of load (e.g., a fragile load) of the load may cause freight vehicle 150 to travel slower. Arrival component 134 may determine the operator should take more downtime intervals. Meaning the minimum number of downtime intervals may increase. Additionally, arrival component 134 can also take into account the minimum number of downtime intervals the operator should take, when determining the estimated time of arrival of freight vehicle 150 to the pick-up and/or destination location.

Arrival component 134 can also include dock logic 132 to optimize the receiving and/or delivery of loads at the pick-up and/or destination location, respectively. In some implementations, dock logic 132 can assign a dock to freight vehicle 150 to either pick up a load specified in a freight service request and/or to drop off a load specified in a freight service request. In such implementations, the assignment of the dock can be based at least on the estimated time of arrival of freight vehicle 150. Additionally, in other implementations, the assignment of the dock can be based on the estimated time of arrival of other freight vehicles that may also be arriving at approximately the same time. In such implementations, arrival component 134 can similarly determine the time of arrival of other freight vehicles as it can for freight vehicle 150.

In various implementations, dock logic 132 can send dock routing instructions to an operator. The dock routing instructions can include instructions to route freight vehicle 150 to the dock assigned to the operator. The dock route can be based on the location information provided by a location based resource of mobile device 140 (e.g., location information 133 of freight vehicle 150) and the location information of the dock assigned to the operator. In some implementations, dock logic 132 can provide the dock routing information to mobile device 140 when dock logic 132 determines that freight vehicle 150 is within a proximity distance threshold of the pick-up location, destination location or the assigned dock. In such implementations, dock logic 132 can determine that freight vehicle 150 is within the proximity distance threshold based on interval data 131 of the operator (e.g., the location information of mobile device 140) and the pick-up location and/or destination location specified by the freight service request or the location information of the assigned dock. Dock logic 132 can obtain interval data 131 of the operator from vehicle monitor 122.

Dock logic 132 can verify the identity of an operator that is picking up and/or dropping off a load specified in a freight service request that the operator that is also assigned to. For example, dock logic 132 can determine if identifier information provided by mobile device 140 of the corresponding operator matches the identifier information already associated with a freight service request. Examples of identifier information include, an operator identifier (e.g., a name of the operator, a photograph of the operator, a phone number of the operator, an identifier associated with government identification of the operator, etc.), a load identifier, a vehicle identifier of freight vehicle 150 that is transporting or will be transporting the load (e.g., VIN number of the freight vehicle), and a freight service identifier (e.g., location information of the pick-up location, location information of the destination location, an alpha numeric identifier, a load identifier, etc.).

Dock logic 132 can cause mobile device 140 of an operator assigned to the freight service request to provide identifier information that dock logic 132 can use to verify the identity of the operator. For example, dock logic 132 can cause mobile device 140 to provide the identifier information when freight vehicle 150 of the operator is within a proximity distance threshold of the pick-up location and/or destination location. Dock logic 132 can determine whether freight vehicle 150 is within a proximity distance threshold of the pick-up location and/or destination location based on the location information of mobile device 140 and the location information of the pick-up and/or destination location specified in the assigned freight service request, respectively. Upon dock logic 132 determining that freight vehicle is within the proximity distance threshold, dock logic 132 can provide instructions to mobile device 140 to provide the identifier information. In such implementations, dock logic 132 can utilize the identifier information provided by mobile device 140 to identify a copy of a freight service request with the same identifier information that is stored in operator store 124.

Network 130 can include one or more networks. Network 130 can be a conventional type, wired or wireless, and can have numerous configurations include a star a star configuration, token ring configuration, or other configurations. Furthermore, network 130 can include an intranet, a local area network (LAN), a wide area network (WAN) (e.g., the Internet), and/or other interconnected data paths across which multiple devices can communicate. In some embodiments, network 130 can be a peer-to-peer network. Network 130 can also be coupled with or include portions of a telecommunications network for sending data using a variety of different communication protocols. In some embodiments, network 130 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 130, network 130 can be more than one network. For example, as illustrated in FIG. 1, network computer system 100, mobile device 140, and in some implementations ELD 155 can communicate over network 130 using wired or wireless connections, or combinations thereof.

methodology

Figure 2:
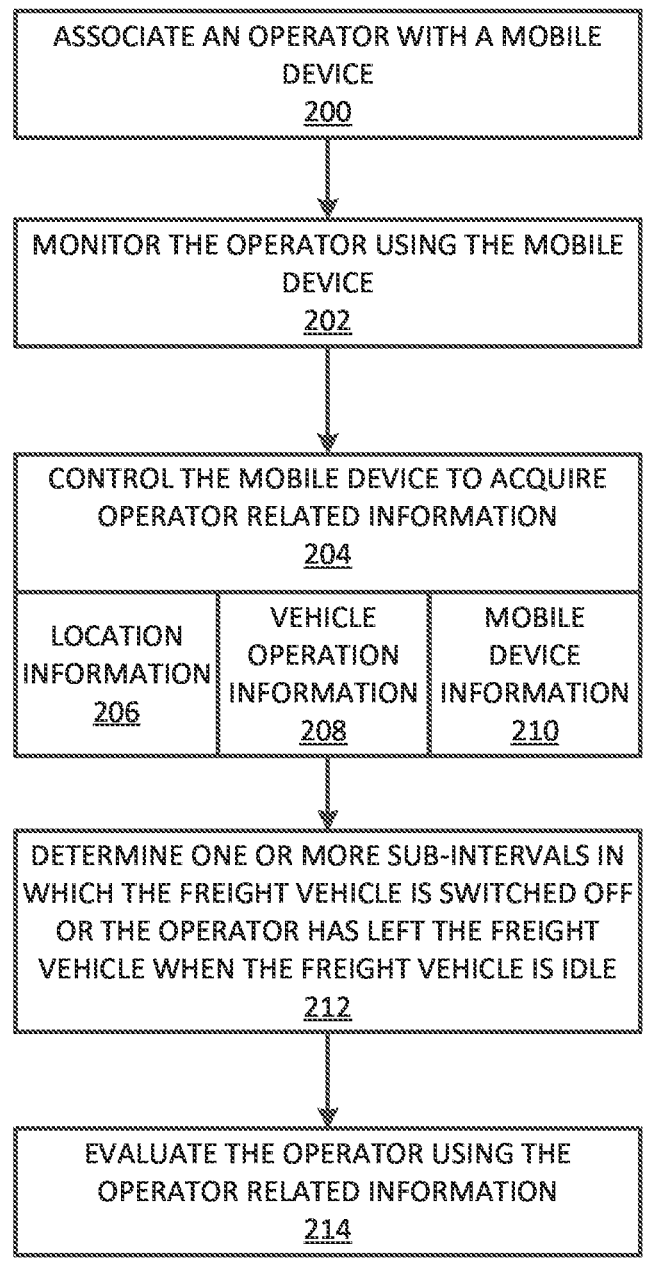
FIG. 2 illustrates an example method for evaluating a freight operator.
Figure 3:
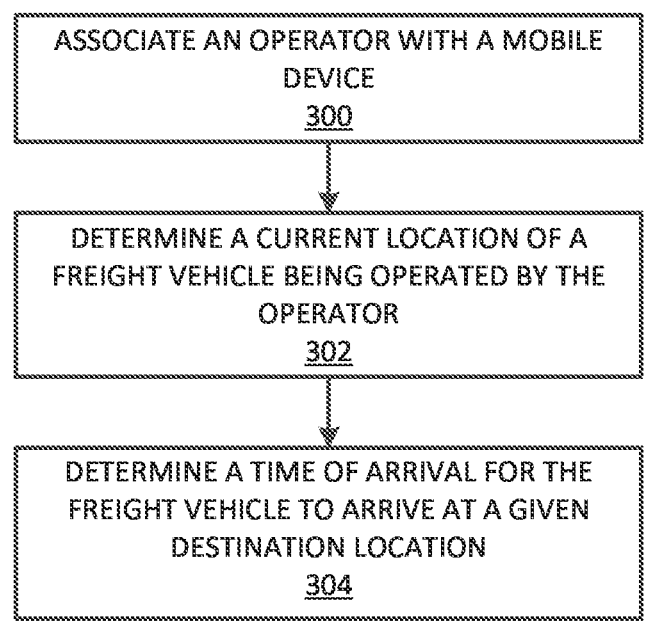
FIG. 3 illustrates an example method for determining a time of arrival for a freight vehicle to arrive at a destination location.

FIG. 2 illustrates an example method for evaluating a freight operator during a time interval that the operator is operating a freight vehicle. FIG. 3 illustrates an example method for determining a time of arrival for a freight vehicle to arrive at a destination location. In the below discussions of FIGS. 2 and 3, reference may be made to reference characters representing like features as shown and described with respect to FIG. 1 for purpose of illustrating a suitable component for performing a set or sub-step being described.

FIG. 2 illustrates an example method for evaluating a freight operator. In some implementations, as illustrated in FIG. 2, network computer system 100 can associate an operator with a mobile device (200). For example, mobile device 140 can provide interval data 131 (e.g., location information 133 of freight vehicle 150, vehicle operation information 135 of freight vehicle 150 and mobile device information 137 of mobile device 140) of an operator during a time interval the operator is operating freight vehicle 150, with a mobile identifier associated with mobile device 140. In some implementations, interval data 131 can additionally include an operator identifier. Additionally, network computer system 100 (e.g., operator store 124 and/or activity data store 126) can associate the mobile identifier with an operator record (or set of records) based on the operator identifiers associated with the operator record and the interval data.

Mobile device 140 can communicate an operator identifier to network computer system 100 using service application 145. Since mobile device 140 is the source of interval data 131, an operator can be evaluated over a duration that the operator is operating multiple freight vehicles. Thus, network computer system 100 can evaluate the performance of the operator regardless of which freight vehicle the operator is operating.

Network computer system 100 can monitor the operator using mobile device 140 (202). Additionally, network computer system 100 can cause or control the mobile device to acquire operator related information, for example, interval data 131 of an operator operating freight vehicle 150 (204). In some examples, network computer system 100 can periodically or continuously obtain interval data 131 of an operator operating freight vehicle 150 by controlling mobile device 140 to acquire and provide interval data 131 to network computer system 100 over a time interval. In some examples, interval data 131 of the operator can include location information of freight vehicle 150 (206). Location information 133 of freight vehicle 150 can be based on the location information provided by a location abased resource of mobile device 140. In other examples, interval data 131 of the operator can further include vehicle operation information 135 of freight vehicle 150 while freight vehicle 150 is in operation (208). Examples of vehicle operation information 135 of freight vehicle 150 include acceleration, braking, when the engine is idle, mileage, fuel consumption, mass air flow, freight vehicle 150 error codes, and an identifier of freight vehicle 150. In yet other examples, interval data 131 of the operator can include mobile device information 137 of mobile device 140 (210). In such examples, mobile device information 137 can include sensor information (e.g., accelerometer information, gyroscope information, etc.) generated from one or more sensors of mobile device 140 (e.g., accelerometer, gyroscope, etc.).

In some implementations, some of vehicle operation information 135 of freight vehicle 150 can be obtained by ELD 155. ELD 155 can be connected to the electronic computing unit (ECU) of freight vehicle 150. Additionally, in such implementations, ELD 155 can provide vehicle operation information 135 obtained from the ECU to mobile device 140 wirelessly (e.g., WIFI, Bluetooth, BLE (Bluetooth low energy), NFC, or other appropriate short-range communication). Additionally, mobile device 140 can provide interval data 131 that includes vehicle operation information 135 obtained from ELD 155 to network computer system 100. In other implementations, network computer system 100 can obtain vehicle operation information 135 from ELD 155 directly from ELD 155.

Based on interval data 131, network computer system 100 can determine one or more sub-intervals that freight vehicle 150 is switched off or the operator has left freight vehicle 150 when freight vehicle 150 is idle (212). For example, non-driving evaluator 112 can determine when freight vehicle 150 is idle based on mobile device information of mobile device 140 (e.g., sensor information indicating a lack of acceleration or movement detected by accelerometer or gyroscope of mobile device 140), location information 133 of freight vehicle 150 (e.g., the location information of mobile device 140 indicating mobile device 140 has not changed over consecutive instances or sub-intervals) and/or vehicle operation information 135 of freight vehicle 150 (e.g., consecutive instances or sub-intervals where the engine power is off and there is no acceleration or deceleration). Additionally, non-driving evaluator 112 can determine freight vehicle 150 is off based on vehicle operation information 135 of freight vehicle 150 (e.g., consecutive instances or sub-intervals where the engine power is off).

In other examples, non-driving evaluator 112 (e.g., off-truck detect logic 110) can determine whether the operator has left freight vehicle 150 (e.g., cab 152), based on mobile device information 137 of mobile device 140. For example, off-truck detect logic 110 can determine from sensor information (e.g., accelerometer information and/or gyroscope information) of mobile device 140 that the operator has left cab 152. In such an example, off-truck detect logic 110 can determine that the sensor information correlates to the operator stepping out of cab 152 of freight vehicle 150 (e.g., an acceleration in a negative direction). Additionally, mobile device 140 can time stamp the sensor data as to when the acceleration was detected. As such, off-truck detect logic 110 can determine when the operator left cab 152. In other implementations, off-truck detect logic 110 can determine whether the operator has left freight vehicle 150 based on whether mobile device 140 is wirelessly or directly connected to ELD 155. For example, off-truck detect logic 110 determines ELD 155 has disconnected from off-truck detect logic 110. In such an example, off-truck detect logic 110 can determine that the operator may have left cab 152 based on determining mobile device 140 and ELD 155 are no longer connected.

Network computer system 100 can evaluate the operator over the time interval using the operator related information, for example, interval data 131 of an operator operating freight vehicle 150 (214). For example, evaluator 102 can obtain interval data 131 (e.g., location information of freight vehicle 50, vehicle operation information 135 of freight vehicle 150, and mobile device information 137 of mobile device 140) of an operator from activity data store 126 to evaluate the driving and/or non-driving related freight service performances of the operator during a time interval. Additionally, evaluator 102 can evaluate the operator by comparing interval data 131 of the operator to an operator model stored in operator model database 114. The operator model can standardize how freight vehicle 150 should be operated. In some implementations, evaluator 102 can quantify (e.g., score) the driving and non-driving related performance of the operator while operating freight vehicle 150.

Evaluator 102 can include driving evaluator 108 to evaluate a driving related freight service performance of the operator during a time interval when the operator is operating freight vehicle 150. Driving evaluator 108 can include safety logic 104 to determine whether operator is operating freight vehicle 150 in a way that is deemed safe, based on, for example models, rules, regulations etc. Additionally, driving evaluator 108 can include performance logic 106 to determine performance metrics of the operator operating freight vehicle 150. The performance metrics can include wear and tear to freight vehicle 150 (e.g., the operator's performance in shifting gears and the effect it has on the transmission of freight vehicle 150) and/or depletable vehicle resources efficiency (e.g., fuel efficiency) as the operator operates freight vehicle 150, based on, for example, models.

Safety logic 104 can utilize interval data 131 of an operator to determine whether the operator is operating freight vehicle 150 in a way that is deemed safe. Additionally, the determination can be based on a comparison between interval data 131 of the operator to an operator model. For example, safety logic 104 can determine a driving pattern or tendency, based on detected characteristics of a type of action that the driver performed (e.g., the operator repeatedly braked very hard and/or accelerated sharply). Additionally, safety logic 104 can base the determination on a comparison between vehicle operation information 135 included in interval data 131 of the operator during a time interval when the operator was operating freight vehicle 150 and the operator model. In other examples, safety logic 104 can determine that during that same time interval, freight vehicle 150 took a high number of left turns in comparison to the operator model. Safety logic 104 can base the determination on the comparison between mobile device information 137 of mobile device 140 (e.g., sensor information, for example, accelerometer information and/or gyroscope information of one or more sensors of mobile device 140) included in interval data 131 of the operator during a time interval when the operator was operating freight vehicle 150 and the operator model. Taken together, safety logic 104 can further determine that the operator operated freight vehicle 150 in a dangerous manner not as safely as the operator model. Additionally, safety logic 104 can quantify such a determination by determining a safety score for the operator based on the comparison between interval data 131 of the operator and the operator model.

Performance logic 106 can utilize interval data 131 of an operator to determine performance metrics of the operator operating freight vehicle 150. Performance logic 106 can make such a determination based on a comparison between interval data 131 of the operator during the time interval and an operator model. For example, performance logic 106 can determine that the operator had operated freight vehicle 150, the operator braked hard, accelerated aggressively, freight vehicle 150 consumed a lot of fuel and had a low fuel efficiency (based on miles traveled versus the amount of fuel consumed). Performance logic 106 can make such a determination based on the comparison between vehicle operation information 135 included in interval data 131 and an operator model. In some implementations, the determination can be alternatively or additionally based on the comparison between mobile device information 137 of mobile device 140 (e.g., the acceleration data of mobile device 140 can indicate the acceleration of freight vehicle 150) included in interval data 131 during the time interval. Taken together, performance logic 106 can determine that the operator, during the time interval, did not operate freight vehicle 150 as well as the operator model. Additionally, performance logic 106 can quantify such a determination by determining a performance score for the operator.

Evaluator 102 can include non-driving evaluator 112 to evaluate non-driving related performance of an operator during a time interval when the operator is operating freight vehicle 150. For example, evaluator 102 can evaluate the operator on the trustworthiness or reputation of the operator. In some implementations, non-driving evaluator 112 can evaluate the reputation of the operator by evaluating how reliable, professional, and/or timely the operator is when performing the assigned freight service. Additionally, the reputation of the operator can be based on the comparison between interval data 131 of the operator to an operator model.

Non-driving evaluator 112 can determine a timeliness of an operator based on an interval data 131 (e.g., location information 133 of freight vehicle 150, vehicle operation information 135 of freight vehicle 150 and/or mobile device information of mobile device 140) of the operator, a hauling route of the freight service and preferred times of arrival to a pick-up location and/or a destination location that is specified in a freight service request. The hauling route can include a pick-up location and/or a destination location that is specified in the freight service request. In some examples, non-driving evaluator 112 can determine when freight vehicle 150 arrives at the pick-up location and/or the destination location, based on the location information provided by mobile device 140. Additionally, non-driving evaluator 112 can determine the timeliness of the operator by comparing the arrival times to the pick-up location and/or the destination location to the preferred times to pick up the load at the pick-up location and/or to drop off the load at the destination location.

Additionally, non-driving evaluator 112 can quantify the determination of timeliness by comparing the how close the arrival times were to the preferred times to an operator model. In some examples, non-driving evaluator 112 can quantify the timeliness of the operator (e.g. a timeliness score) to the pick-up location. In other examples, non-driving evaluator 112 can quantify the timeliness of the operator to the destination location. In yet other examples, non-driving evaluator 112 can quantify the overall freight service completion time (from the pick-up location to the destination location).

In some implementations, an individual at the pick-up location and/or destination location (e.g., the operator and/or requester) can confirm whether the operator picked up the load at the pick-up location and/or dropped off the load at the destination location. In such implementations, the individual can transmit a confirmation message from a mobile device (e.g., mobile device 140) to network computer system 100. For example, the individual can transmit the confirmation message from service application 145, through network(s) 130 and to network computer system 100. The confirmation message can include whether the load was picked up at the pick-up location or dropped-off/received at the destination location. In some examples, non-driving evaluator 112 can determine the time when the confirmation message was sent by the individual or received by network computer system 100. Additionally, non-driving evaluator 112 can take into account such times when determining the timeliness of the operator or confirming the pickup/drop-off times.

In other implementations, non-driving evaluator 112 can determine whether the operator is picking up a load or dropping off a load based on sensor information generated by mobile device 140. In such implementations, mobile device 140 can include one or more sensors (e.g., accelerometer and/or gyroscope) and the data generated from the one or more sensors can be included in interval data 131 (e.g., mobile device information 137 of mobile device 140) to be utilized by non-driving evaluator 112. provided to non-driving evaluator included in interval data 131. In some examples, non-driving evaluator 112 can determine that the sensor information correlates to the operator picking-up the load. In other examples, non-driving evaluator 112 can determine that the sensor information correlates to the operator dropping off the load. In conjunction with the location information of mobile device 140, non-driving evaluator 112 can confirm that the load was picked up at the pick-up location and/or dropped off at the destination location. Additionally, non-driving evaluator 112 can determine when the load was picked up and/or dropped off and take into account when the load was picked up and/or dropped off when determining the timeliness of the operator.

Non-driving evaluator 112 can also utilize feedback provided by a requester to evaluate the non-driving aspects of the performance of the operator. In some implementations, the requester can provide feedback by providing a rating or other quantitative metric related to one or more parameters of the operator's freight service performance. For example, network computer system 100 can provide an instruction to a service application running on a mobile device of a requester of a freight service request to generate a feedback user interface. The feedback user interface can enable the requester to provide a rating or other quantitative metric for one or more parameters of the operator's freight service performance. Examples of parameters of the operator's freight service performance that the requester can provide a rating or other quantitative metric for include, timeliness of operator to pick-up location, timeliness of operator to destination location, speed of loading the load, professionalism, courteousness, the overall delivery service of the requester and state of load at drop off. Additionally, non-driving evaluator 112 can utilize the provided ratings and quantitative metrics to determine an overall reputation score for the operator. In some implementations, non-driving evaluator 112 can compare the ratings and quantitative metrics provided by the mobile device of the requester to an operator model when determining a reputation score for the operator.

In some implementations, the requester can also provide qualitative comments in conjunction with their quantitative assessment of the operator's freight service performance. For example, the instruction to generate the feedback user interface can also include an instruction to enable the requester to input qualitative comments. In some instances, the instruction can cause the feedback user interface to generate a text box for the requester to manually input their comments. In other instances, the instruction can cause the feedback user interface to generate a dropdown menu of pre-generated comments for the requester to select.

Other non-driving related freight service performance examples that evaluator 102 can evaluate operator on include whether the operator has left freight vehicle 150 (e.g., cab 152). In some implementations, non-driving evaluator 112 can utilize off-truck detect logic 110 to determine whether the operator has left freight vehicle 150, based on the sensor information (e.g., accelerometer information and/or gyroscope information) of mobile device 140 (e.g., mobile device information 137 of mobile device 140). In some examples, off-truck detect logic 110 can determine that the sensor information correlates to the operator stepping out of cab 152 of freight vehicle 150 (e.g., an acceleration in a negative direction). Additionally, mobile device 140 can time stamp the sensor information as to when such information was detected. As such, off-truck detect logic 110 can determine when the operator left cab 152. In other implementations, off-truck detect logic 110 can determine whether the operator has left freight vehicle 150 based on whether mobile device 140 is wirelessly or directly connected to ELD 155. For example, off-truck detect logic 110 can determine ELD 155 has been disconnected from mobile device 140. In such an example, off-truck detect logic 110 can determine that the operator may have left cab 152 based in part on determining mobile device 140 and ELD 155 are no longer connected. Additionally, off-truck detect logic 110 can determine and utilize the times of when mobile device 140 and ELD 155 were disconnected when evaluating the operator.

Evaluator 102 can select an operator model to compare interval data 131 of an operator to, based on freight service parameters associated with each operator model that most resembles the parameters of the freight service the operator performed. In such implementations, evaluator 102 can include an operator model database 114. Operator model database 114 can store multiple operator models or just one generic operator model. In examples where operator model database 114 stores multiple operator models, each operator model can be associated with one or more freight service parameters. Examples of freight service parameters include a specific load weight, a range of load weight, a specific freight vehicle size, a range of freight vehicle sizes, a type of freight vehicle (e.g., a freight vehicle with refrigeration capabilities versus a freight vehicle without refrigeration capabilities), a type of load (e.g., perishable versus non-perishable loads, fragile versus non-fragile loads, etc.), weather conditions encountered and/or traffic conditions encountered.

Evaluator 102 can further analyze interval data 131 of the operator in light of weather data and/or traffic data when determining the driving and non-driving performance of the operator while operating freight vehicle 150. In some implementations, evaluator 102 can obtain environmental information that includes the weather information and/or traffic information from a third-party provider. Alternatively, the weather information and/or traffic information can be obtained from one or more sensors from freight vehicle 150 and other freight vehicles traveling in and around the same region as freight vehicle 150. In either implementation, evaluator 102 (e.g., safety logic 104, performance logic 106 and/or non-driving evaluator 112) can obtain the weather information and/or traffic information of the same region where the operator was operating freight vehicle 150 and during the same time interval as when interval data 131 was taken.

In some examples, safety logic 104 can determine a high safety score for the operator if compared to the operator model, safety logic 104 determines there was a higher rate of soft braking, a higher number of times freight vehicle 150 is accelerating, and that there were heavy rains and heavy traffic conditions at the time interval data 131 was taken and at the at the locations freight vehicle 150 was traveling in. In another example, performance logic can determine a low performance score for the operator if compared to the operator model, performance logic 106 determines a higher rate of hard braking, higher number of times freight vehicle 150 accelerated aggressively, fuel consumption was higher, and that it was sunny and traffic conditions were light at the time interval data 131 was taken and at the at the locations freight vehicle 150 was traveling in. In yet another example, non-driving evaluator 112 can determine a high timeliness score for the operator if compared to the operator model, non-driving evaluator 112 determines there was delay to the pick-up location, delay to the destination location, and there were heavy traffic conditions at the time interval data 131 was taken and at the locations freight vehicle 150 was traveling in.

Network computer system 100 can include monitor 116 to monitor an operator while an operator operates freight vehicle 150 during a time interval. As illustrated in FIG. 1, monitor 116 can include service time logic 118, vehicle monitor 122 and operator restriction monitor 120. In some implementations, monitor 116 can determine whether the operator has exceeded a freight service time restriction (e.g., the maximum amount of time an operator is legally allowed to operate freight vehicle 150 or a predetermined time an operator can operate freight vehicle 150). For example, vehicle monitor 122 can periodically or continuously obtain interval data 131 of an operator to determine whether an amount of time the operator has operated freight vehicle 150 is equal to or exceeded a freight service time restriction.

In some implementations, service time logic 118 can determine the amount of time an operator has operated freight vehicle 150 during a time interval (e.g., a hauling event, a day, a week, a month, etc.) based on interval data 131 obtained from activity data store 126 and/or operator store 124. For example, service time logic 118 can determine how long an operator has operated freight vehicle 150 by determining (i) when mobile device 140 was connected to ELD 155, (ii) when mobile device 140 was disconnected from ELD 155, (iii) when the engine was turned on and/or (iv) when the engine was turned off. Additionally, in some implementations, service time logic 118 can determine the amount of time the operator has operated freight vehicle 150 by can taking into account (i) instances or sub-intervals of when the operator stops operating freight vehicle 150 (e.g., by determining, from vehicle operation information 135, when the engine of freight vehicle 150 is off), (ii) instances or sub-intervals of when freight vehicle 150 is idle (e.g., by determining, from vehicle operation information 135 and the location information of mobile device 140, when the engine is on but freight vehicle 150 is not moving), and (iii) instances or sub-intervals of when operator has left freight vehicle 150 (e.g., from location information of mobile device 140 and/or whether mobile device 140 has disconnected from ELD 155).

Additionally, in such implementations, monitor 116 can include operator restriction monitor 120 to determine whether the operator has exceeded a freight service time restriction, by determining whether the amount of time the operator has operated freight vehicle 150 is equal to or greater than the freight service time restriction. In some implementations, operator restriction monitor 120 can obtain data indicating the amount of time the operator has operated freight vehicle 150 in a time interval from service time logic 118. Additionally, operator restriction monitor 120 can compare the amount of time the operator has operated freight vehicle 150 to the freight service time restriction. In some examples, operator restriction monitor 120 can determine that the amount of time the operator has operated freight vehicle 150 is equal to or exceeds the freight service time restriction. Additionally, operator restriction monitor 120 can restrict the operator from accepting or selecting a freight service request presented on service application 145. For instance, operator restriction monitor 120 can provide an instruction to service application 145 to restrict the operator from selecting or accepting any freight service request presented by service application 145.

In other examples, operator restriction monitor 120 can determine that the amount of time an operator has operated freight vehicle 150 is less than the freight service time restriction. In such examples, operator restriction monitor 120 can limit which freight service request the operator can select or accept that is presented on service application 145. For instance, operator restriction monitor 120 can determine the amount of time remaining before the operator will exceed the freight service time restriction (e.g., based on interval data 131 of the operator, operator restriction monitor 120 can determine the amount of time remaining between the amount of time the operator has already operated freight vehicle 150 and the freight service time restriction). Additionally, operator restriction monitor 120 can determine an estimated service completion time for each freight service request obtained by network computer system 100. For instance, operator restriction monitor 120 can take into account the pick-up location, destination location, any indicated preferred time of freight service completion included in the freight service request. Taken together, operator restriction monitor 120 can identify one or more freight service requests obtained by network computer system 100 that have an estimated service completion time that is less than or equal to the amount of time remaining before the operator will exceed the freight service time restriction. In some implementations, operator restriction monitor 120 can provide an instruction to service application 145 to present only the identified one or more freight service requests. In other implementations, operator restriction monitor 120 can provide an instruction to service application 145 to limit the operator ton only be able to select a freight service request that is one of the identified one or more freight service requests.

Other parameters, operator restriction monitor 120 can take into account when determining the estimated service completion time for each freight service request obtained by network computer system 100, include (i) traffic data, (ii) weather data, and (iii) interval data 131 of an operator (e.g., current location of freight vehicle 150, vehicle operation information 135 of freight vehicle 150, and information of mobile device 140) operating freight vehicle 150, when determining the estimated service completion time for each freight service request obtained by network computer system 100.

FIG. 3 illustrates an example method for determining a time of arrival for a freight vehicle to arrive at a destination location. In some implementations, and similar to the example method illustrated in FIG. 2, network computer system 100 can associate an operator with mobile device 140 (300). Additionally, network computer system 100 can determine a current location of freight vehicle 150 being operated by the operator (302). For example, monitor 116 can obtain the location information of mobile device 140 from operator store 124 and/or activity data store 126. Additionally, monitor 116 can determine the current location of freight vehicle 150 being operated by the operator based on the location information of mobile device 140.

Network computer system 100 can determine a time of arrival for freight vehicle 150 to arrive at a given destination location (304). The destination location can be included in the freight service request assigned to the operator. In some examples, arrival component 134 can determine from interval data 131 (e.g., location information 133 of freight vehicle 150, vehicle operation information 135 of freight vehicle 150 and mobile device information 137 of mobile device 140) of the operator during a time interval when the operator is operating freight vehicle 150, a time of arrival for freight vehicle 150 to arrive at the destination location. Additionally, based on interval data 131, arrival component 134 can at any given instance a time of arrival freight vehicle 150 to arrive at the destination location based on (i) a distance between the current location of freight vehicle 150 to the given destination location and (ii) a time for freight vehicle 150 to travel to the destination location.

Arrival component 134 can determine the distance between the current location of freight vehicle 150 to the destination location based on the location information of mobile device 140 and location information of the destination location included in the freight service request. Additionally, arrival component 134 can determine a time for freight vehicle 150 to travel to the destination location, based on the distance between the current location of freight vehicle 150 to the destination location and vehicle operation information 135 of freight vehicle 150 and/or mobile device information 137 of mobile device 140 (e.g., service time logic 118 can determine from vehicle operation information 135 of freight vehicle 150 and/or sensor data (accelerometer) and location information 133 of freight vehicle 150 from location information from a location based resource of mobile device 140 the speed that freight vehicle 150 is traveling).

In various implementations, arrival component 134 can take into account the minimum number of downtime intervals (e.g., rest periods or periods of time an operator is not operating freight vehicle 50 so as to not exceed a freight service time restriction) and the duration of each downtime intervals an operator should take, when determining the estimated time of arrival that freight vehicle 150 is to arrive at the pick-up location and/or destination location. In such implementations, the number of downtime intervals and the duration of each downtime interval can be based on (i) an estimated time for freight vehicle 150 to arrive at the destination location (e.g., based on the current location of freight vehicle 150), (ii) a distance between the current location of freight vehicle 150, (iii) the amount of time the operator has operated freight vehicle 150 (as determined from data generated by service time logic 118), and (iv) the service time restriction (as provided by operator restriction monitor 120).

In some implementations, arrival component 134 can take into account environmental information (e.g., traffic and/or weather information) when determining the minimal amount of time or downtime intervals that an operator should take as to not exceed a freight service time restriction. For example, the traffic conditions and weather conditions an operator may encounter or is currently encountering may cause freight vehicle 150 to slow down and cause delays. As such, arrival component 134 may determine that the operator should take more downtime intervals due to the traffic and weather conditions the operator is encountering or may encounter, which may result in the minimum number of downtime intervals increasing. In other examples, arrival component 134 may determine that the traffic conditions and/or the weather conditions the operator may encounter or is encountering may not inhibit the speed of freight vehicle 150. As such, arrival component 134 may determine the operator could take less downtime intervals. Meaning the minimum number of downtime intervals may decrease.

In various implementations, arrival component 134 can take into account when determining an estimated time of arrival, weather and/or traffic conditions the operator may be currently in while performing their assigned freight service. For example, a third-party provider can provide environmental information that includes weather information and/or real-time traffic information to arrival component 134. Arrival component 134 can determine the current weather and/or current traffic conditions at the current location of the operator and freight vehicle 150 based on the environmental information and the location information of mobile device 140. Additionally, arrival component 134 can determine any delays the operator is encountering and determine and/or adjust the estimated time of arrival based on the delays that the operator is encountering.

In some implementations, arrival component 134 can determine traffic conditions and/or weather conditions the operator may encounter while performing their assigned freight service based on the sensor data and the hauling route the operator is taking. For example, arrival component 134 can determine that an accident occurred on the hauling route the operator is currently taking. In such an example, arrival component 134 can determine an estimated delay the operator may encounter and determine and/or adjust the estimate time of arrival based on the potential delay. In other examples, arrival component 134 can determine that weather conditions on the hauling route the operator is currently taking will likely get worse and cause a delay. In such examples, arrival component 134 can determine and/or adjust the estimated time of arrival based on the potential delay.

In some implementations, service time logic 118 can determine that an operator is currently in a downtime interval and arrival component 134 can utilize such data to determine a remaining amount of downtime the operator should be in before being able to resume operating freight vehicle 150. In such implementations, service time logic 118 can make such determinations based on interval data 131 of the operator provided by vehicle monitor 122. For example, service time logic 118 can determine that an operator is currently in a downtime interval and the amount of downtime the operator has left, based on vehicle operation information 135 of freight vehicle 150 (e.g., instances of when the engine was turned off) and/or mobile device information 137 of mobile device 140 (e.g., instances of when mobile device 140 was disconnected from electronic logging device 155 and/or instances of when the operator is not at the same location as freight vehicle 150) included in interval data 131. Additionally, based on the determined minimum duration of each downtime interval an operator should take, arrival component 134 can determine the amount of downtime remaining before the operator can resume operating freight vehicle 150.

In some examples, a downtime interval can include the estimated amount of time an operator is to pick up a load at the pick-up location. Arrival component 134 can determine the estimated amount of time an operator picks up a load at a pick-up location, based on historical interval data 131 (e.g., location information 133 of freight vehicle 150, vehicle operation information 135 of freight vehicle 150 and mobile device information 137 of mobile device 140) stored in operator store 124. In other examples, a downtime interval can include the estimated amount of time an operator is to change out a load that is already in trailer 154. In such examples, an operator could be assigned to multiple freight service requests, and upon arriving at one destination location, the operator is to drop off one load, but pick up another load, before proceeding to the next destination location. Arrival component 134 can determine the estimated amount of time an operator changes out a load, based on historical interval data 131 (e.g., location information 133 of freight vehicle 150, vehicle operation information 135 of freight vehicle 150 and mobile device information 137 of mobile device 140) stored in operator store 124.

Arrival component 134 can take into account the number of fuel stops freight vehicle 150 will likely have to take when determining the time of arrival freight vehicle is estimated to arrive at the pick-up location and/or destination location. Additionally, arrival component 134 can take into account the distance between the current location of freight vehicle 150 (e.g., location information 133) to the pick-up and/or destination location specified in the freight service request, when determining the number of fuel stops freight vehicle 150 will likely have to take. Additionally, arrival component 134 can determine from vehicle operation information 135 (e.g., the amount of fuel used as compared to the average distance traveled) of interval data 131, provided by vehicle monitor 122, the fuel efficiency of freight vehicle 150. Taken together, arrival component 134 can determine the number of fuel stops the operator may need to take to travel to the destination location.

Arrival component 134 can take into account size of a load a weight of the load and/or a type of the load to be transported by freight vehicle 150 when determining the estimated time of arrival. For example, the heavier the load, the slower freight vehicle 150 can travel. Additionally, the heavier the load, the worse the fuel efficiency of freight vehicle 150. Meaning freight vehicle 150 may need more fuel to travel to ta destination location specified in a freight service request. In some examples, arrival component 134 can take into account, the type of load, for example, whether the load is fragile or not, when determining the estimated time of arrival. For instance, a fragile load could cause the operator to operate freight vehicle 150 more carefully and/or more slowly. In some implementations, the load size and/or weight can be included in the freight service request. In other implementations, the size and/or weight of the load may be detected by one or more sensors (e.g., optical and weight bearing sensors) included in trailer 154. In such examples, the sensor data including the size and/or weight of the load can be included in interval data 131 provided by mobile device 140 and/or electronic logging device 155.

In some implementations, arrival component 134 can take into account the size, weight and/or type of the load when determining the minimum number of downtime intervals the operator should take. For example, arrival component 134 may determine that the weight, size and/or type of load (e.g., a fragile load) of the load may cause freight vehicle 150 to travel slower. Arrival component 134 may determine the operator should take more downtime intervals. Meaning the minimum number of downtime intervals may increase. Additionally, arrival component 134 can also take into account the minimum number of downtime intervals the operator should take, when determining the estimated time of arrival of freight vehicle 150 to the pick-up and/or destination location.

Arrival component 134 can also include dock logic 132 to optimize the receiving and/or delivery of loads at the pick-up and/or destination location, respectively. In some implementations, dock logic 132 can assign a dock to freight vehicle 150 to either pick up a load specified in a freight service request and/or to drop off a load specified in a freight service request. In such implementations, the assignment of the dock can be based at least on the estimated time of arrival of freight vehicle 150. Additionally, in other implementations, the assignment of the dock can be based on the estimated time of arrival of other freight vehicles that may also be arriving at approximately the same time. In such implementations, arrival component 134 can similarly determine the time of arrival of other freight vehicles as it can for freight vehicle 150.

In various implementations, dock logic 132 can send dock routing instructions to an operator. The dock routing instructions can include instructions to route freight vehicle 150 to the dock assigned to the operator. The dock route can be based on the location information provided by a location based resource of mobile device 140 (e.g., location information 133 of freight vehicle 150) and the location information of the dock assigned to the operator. In some implementations, dock logic 132 can provide the dock routing information to mobile device 140 when dock logic 132 determines that freight vehicle 150 is within a proximity distance threshold of the pick-up location, destination location or the assigned dock. In such implementations, dock logic 132 can determine that freight vehicle 150 is within the proximity distance threshold based on interval data 131 of the operator (e.g., location information of mobile device 140) and the pick-up location and/or destination location specified by the freight service request or the location information of the assigned dock. Dock logic 132 can obtain interval data 131 of the operator from vehicle monitor 122.

Dock logic 132 can verify the identity of an operator that is picking up and/or dropping off a load specified in a freight service request that the operator that is also assigned to. For example, dock logic 132 can determine if identifier information provided by mobile device 140 of the corresponding operator matches the identifier information already associated with a freight service request. Examples of identifier information include, an operator identifier (e.g., a name of the operator, a photograph of the operator, a phone number of the operator, an identifier associated with government identification of the operator, etc.), a load identifier, a vehicle identifier of freight vehicle 150 that is transporting or will be transporting the load (e.g., VIN number of the freight vehicle), and a freight service identifier (e.g., location information of the pick-up location, location information of the destination location, an alpha numeric identifier, a load identifier, etc.).

Dock logic 132 can cause mobile device 140 of an operator assigned to the freight service request to provide identifier information that dock logic 132 can use to verify the identity of the operator. For example, dock logic 132 can cause mobile device 140 to provide the identifier information when freight vehicle 150 of the operator is within a proximity distance threshold of the pick-up location and/or destination location. Dock logic 132 can determine whether freight vehicle 150 is within a proximity distance threshold of the pick-up location and/or destination location based on the location information of mobile device 140 and the location information of the pick-up and/or destination location specified in the assigned freight service request, respectively. Upon dock logic 132 determining that freight vehicle is within the proximity distance threshold, dock logic 132 can provide instructions to mobile device 140 to provide the identifier information. In such implementations, dock logic 132 can utilize the identifier information provided by mobile device 140 to identify a copy of a freight service request with the same identifier information that is stored in operator store 124.

Hardware Diagram

Figure 4:
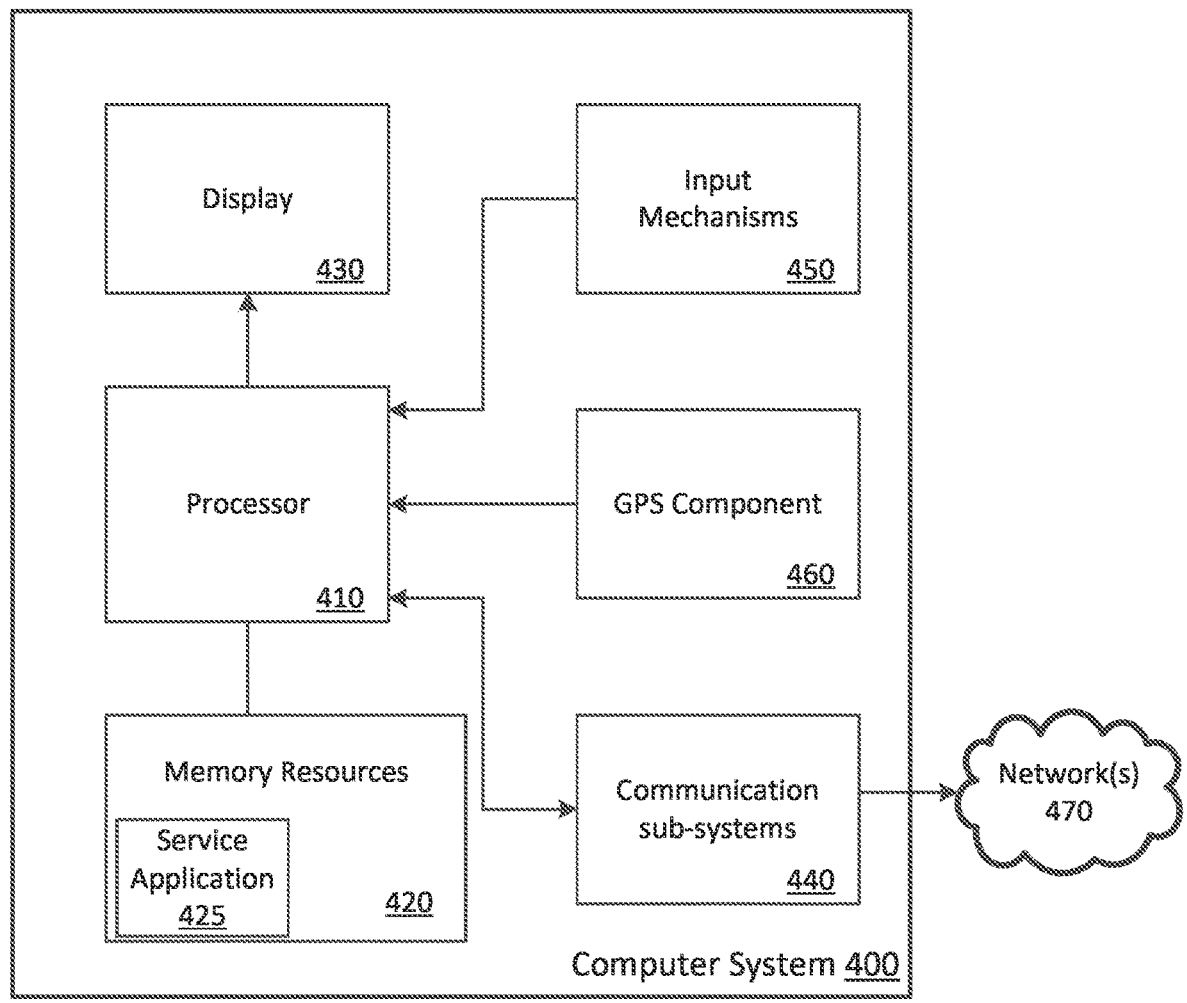
FIG. 4 illustrates a computer system upon which aspects described herein may be implemented.

FIG. 4 is a block diagram that illustrates a computer system upon which examples described herein may be implemented. In one embodiment, computer system 400 may correspond to a mobile computing device, such as a cellular device that is capable of telephony, messaging, and data services. Computer system 400 can correspond to a device operated by a requester or, in some examples, a device operated by the service provider (e.g., a freight operator) that provides location-based services. Examples of such devices include smartphones, handsets, tablet devices, or in-vehicle computing devices that communicate with cellular carriers. Computer system 400 includes processor 410, memory resources 420, display component 430 (e.g., such as a touch-sensitive display device), one or more communication systems 440 (including wireless communication systems), one or more sensors 450 (e.g., accelerometer and/or gyroscope, microphone, barometer, etc.), and one or more location detection components (e.g., GPS component) 460. In one example, at least one communication system 440 sends and receives cellular data over network(s) 470 (e.g., data channels and voice channels). Communication sub-systems 440 can include a cellular transceiver and one or more short-range wireless transceivers. Processor 410 can exchange data with a service arrangement system (not illustrated in FIG. 4) via the one or more communications sub-systems 440 and over network(s) 970.

Processor 410 can provide a variety of content to display component 430 by executing instructions stored in memory resources 420. Memory resources 420 can store instructions for service application 425. For example, processor 410 can execute the service application 425 to read sensor data from one or more sensors 450 of the computing device, and to transmit the sensor data, along with location data of GPS component 460 as local device data to a network computer system (e.g. network computer system 100).

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing system comprising:
    one or more processors; and
    one or more tangible, non-transitory, computer readable media that store instructions that are executable by the one or more processors to cause the computing system to perform operations, the operations comprising:
    receiving interval data associated with a freight operator of a freight vehicle;
    determining a performance of the freight operator in operating the freight vehicle based on the interval data;
    determining an estimated time of arrival of the freight vehicle at a destination location based on the performance of the freight operator;
    selecting a dock for the freight vehicle at the destination location based on the estimated time of arrival; and
    providing dock routing instructions to the freight operator, wherein the dock routing instructions indicate a route to the dock selected for the freight vehicle.

2. The computing system of claim 1, wherein the performance of the freight operator in operating the freight vehicle is indicative an off-truck detection that identifies when the freight operator has left the freight vehicle.

3. The computing system of claim 2, further comprising at least one mobile device associated with the freight operator and at least one vehicle device located onboard the freight vehicle, wherein the at least one mobile device is communicatively connected to the at least one vehicle device, and wherein determining the performance of the freight operator in operating the freight vehicle based on the interval data comprises:
    identifying the off-truck detection in response to detecting that the at least one mobile device has been disconnected from the at least one vehicle device; and
    in response to the off-truck detection, determining a time that the freight operator is located away from the freight vehicle.

4. The computing system of claim 3, wherein determining the estimated time of arrival of the freight vehicle at the destination location based on the performance of the freight operator comprises:
    determining the estimated time of arrival based on the time that the freight operator is located away from the freight vehicle.

5. The computing system of claim 3, wherein the interval data comprises real-time interval data indicative of at least one of: (i) a real-time location of the freight vehicle, (ii) a real-time operation of the freight vehicle, or (iii) real-time sensor data of the at least one mobile device.

6. The computing system of claim 5, wherein the real-time sensor data is indicative of a wireless connection between the at least one mobile device and the at least one vehicle device.

7. The computing system of claim 1, wherein the interval data comprises historical interval data collected for the freight operator during a plurality of freight services previously performed by the freight operator, the historical interval data indicative of at least one of: (i) a historical location of the freight vehicle, (ii) a historical operation of the freight vehicle, or (iii) historical sensor data of at least one mobile device associated with the freight operator.

8. The computing system of claim 7, wherein determining the performance of the freight operator in operating the freight vehicle based on the interval data comprises determining an expected performance of the freight operator based on the historical interval data.

9. The computing system of claim 8, wherein the expected performance of the freight operator comprises a downtime interval indicative of an average amount of time the freight operator spends at one or more weigh stations.

10. The computing system of claim 7, wherein receiving the interval data associated with the freight operator of the freight vehicle comprises:
    obtaining an operator identifier from at least one mobile device associated with the freight operator; and
    accessing an operator account corresponding to the freight operator based on the operator identifier, wherein the operator account comprises the historical interval data.

11. The computing system of claim 10, wherein the operator account is indicative of an operator evaluation, and wherein the estimated time of arrival of the freight vehicle at the destination location is based on the operator evaluation.

12. The computing system of claim 11, wherein the operator evaluation is based on a comparison between the historical interval data collected for the freight operator and at least one operator model descriptive of an average performance of a plurality of different freight operators.

13. A computer-implemented method comprising:
    receiving interval data associated with a freight operator of a freight vehicle;
    determining a performance of the freight operator in operating the freight vehicle based on the interval data;
    determining an estimated time of arrival of the freight vehicle at a destination location based on the performance of the freight operator; selecting a dock for the freight vehicle at the destination location based on the estimated time of arrival; and
    providing dock routing instructions to the freight operator, wherein the dock routing instructions indicate a route to the dock selected for the freight vehicle.

14. The computer-implemented method of claim 13, wherein receiving the interval data associated with the freight operator of the freight vehicle comprises:
   receiving mobile device data for the freight operator from at least one mobile device associated with the freight operator; and
   receiving location data for the freight vehicle and operation data for the freight vehicle from at least one vehicle device located onboard the freight vehicle.

15. The computer-implemented method of claim 14, wherein the at least one mobile device is wirelessly connected to the at least one vehicle device.

16. The computer-implemented method of claim 14, wherein the mobile device data comprises an operator identifier corresponding to the freight operator.

17. The computer-implemented method of claim 16, wherein determining the performance of the freight operator in operating the freight vehicle based on the interval data, comprises:
   accessing an operator account corresponding to the freight operator based on the operator identifier; and
   determining an expected performance of the freight operator in operating the freight vehicle based on the operator account.

18. The computer-implemented method of claim 17, wherein the operator account comprises one or more performance metrics for the freight operator.

19. The computer-implemented method of claim 17, wherein the operator account is indicative of a timeliness of the freight operator.

20. One or more non-transitory computer readable media storing instructions that are executable by one or more processors to perform operations comprising:
   receiving interval data associated with a freight operator of a freight vehicle;
   determining a performance of the freight operator in operating the freight vehicle based on the interval data;
   determining an estimated time of arrival of the freight vehicle at a destination location based on the performance of the freight operator;
   selecting a dock for the freight vehicle at the destination location based on the estimated time of arrival; and
   providing dock routing instructions to the freight operator, wherein the dock routing instructions indicate a route to the dock selected for the freight vehicle.

* * * * *